United States Patent
Lee et al.

(10) Patent No.: US 11,625,577 B2
(45) Date of Patent: Apr. 11, 2023

(54) METHOD AND APPARATUS FOR NEURAL NETWORK QUANTIZATION

(71) Applicant: Samsung Electronics Co., Ltd., Suwon-si (KR)

(72) Inventors: Wonjo Lee, Uiwang-si (KR); Seungwon Lee, Hwaseong-si (KR); Junhaeng Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 494 days.

(21) Appl. No.: 16/738,338

(22) Filed: Jan. 9, 2020

(65) Prior Publication Data
US 2020/0218962 A1    Jul. 9, 2020

(30) Foreign Application Priority Data
Jan. 9, 2019    (KR) .................. 10-2019-0002986

(51) Int. Cl.
*G06N 3/08* (2006.01)
*G06N 3/04* (2023.01)
*G06N 3/084* (2023.01)

(52) U.S. Cl.
CPC ......... *G06N 3/0454* (2013.01); *G06N 3/0472* (2013.01); *G06N 3/084* (2013.01)

(58) Field of Classification Search
CPC ............ G06N 3/063; G06N 3/02; G06N 3/08; G06N 3/0454; G06N 3/049
USPC .......................................................... 706/15
See application file for complete search history.

(56) References Cited

U.S. PATENT DOCUMENTS

| | | |
|---|---|---|
| 5,634,063 A | 5/1997 | Ahn et al. |
| 2017/0270408 A1 | 9/2017 | Shi et al. |
| 2017/0323197 A1 | 11/2017 | Gibson et al. |
| 2018/0046905 A1 | 2/2018 | Li et al. |
| 2018/0197084 A1 | 7/2018 | Kim et al. |
| 2018/0314940 A1* | 11/2018 | Kundu ............... G06N 3/0454 |
| 2019/0042948 A1 | 2/2019 | Lee et al. |
| 2019/0339939 A1 | 11/2019 | Ito et al. |

(Continued)

FOREIGN PATENT DOCUMENTS

| | | |
|---|---|---|
| JP | 2018-124681 A | 8/2018 |
| KR | 1994-0004463 A | 3/1994 |
| KR | 10-2018-0083030 A | 7/2018 |

OTHER PUBLICATIONS

Lin, Darryl et al., "Fixed Point Quantization of Deep Convolutional Networks", *International Conference on Machine Learning*, Jun. 2, 2016 (10 pages in English).

(Continued)

*Primary Examiner* — Gordon G Liu
(74) *Attorney, Agent, or Firm* — NSIP Law

(57) ABSTRACT

According to a method and apparatus for neural network quantization, a quantized neural network is generated by performing learning of a neural network, obtaining weight differences between an initial weight and an updated weight determined by the learning of each cycle for each of layers in the first neural network, analyzing a statistic of the weight differences for each of the layers, determining one or more layers, from among the layers, to be quantized with a lower-bit precision based on the analyzed statistic, and generating a second neural network by quantizing the determined one or more layers with the lower-bit precision.

20 Claims, 21 Drawing Sheets

(56) References Cited

U.S. PATENT DOCUMENTS

2019/0385050 A1* 12/2019 Wang .................. G06N 3/04
2020/0380357 A1* 12/2020 Yao ..................... G06N 3/084

OTHER PUBLICATIONS

Lee, Jun Haeng, et al., "Quantization for Rapid Deployment of Deep Neural Networks", arXiv preprint arXiv:1810.05488, Oct. 12, 2018 (pp. 1-9).

Zhu, Xiaotian et al., "Adaptive Layerwise Quantization for Deep Neural Network Compression", *2018 IEEE International Conference on Multimedia and Expo (ICME)*, 2018 (6 pages in English).

Ko, Jong Hwan et al., "Design and Analysis of a Neural Network Inference Engine Based on Adaptive Weight Compression", *IEEE Transactions on Computer-Aided Design of Integrated Circuits and Systems,* vol. 38, Issue 1, Jan. 2019 (pp. 109-121).

Extended European Search Report dated May 29, 2020 in counterpart European Patent Application No. 19210968.4 (10 pages in English).

Zhou, Shuchang, et al., "Dorefa-net: Training Low Bitwidth Convolutional Neural Networks with Low Bitwidth Gradients.", arXivpreprint arXiv:1606.06160, 2016 (pp. 1-13).

Khoram, Soroosh et al., "Adaptive Quantization of Neural Networks", Published as a conference paper at ICLR 2018, 2018 (pp. 1-13).

Japanese Office Action dated Jan. 4, 2023, in counterpart Japanese Patent Application No. 2020-002058 (5 pages in English, 4 pages in Japanese).

* cited by examiner

FIG. 4
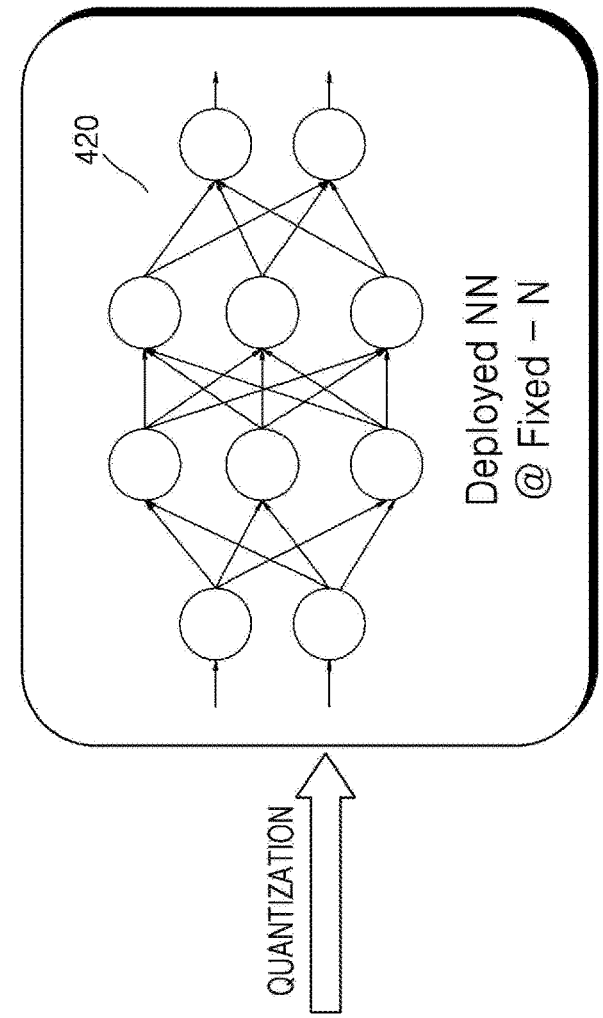
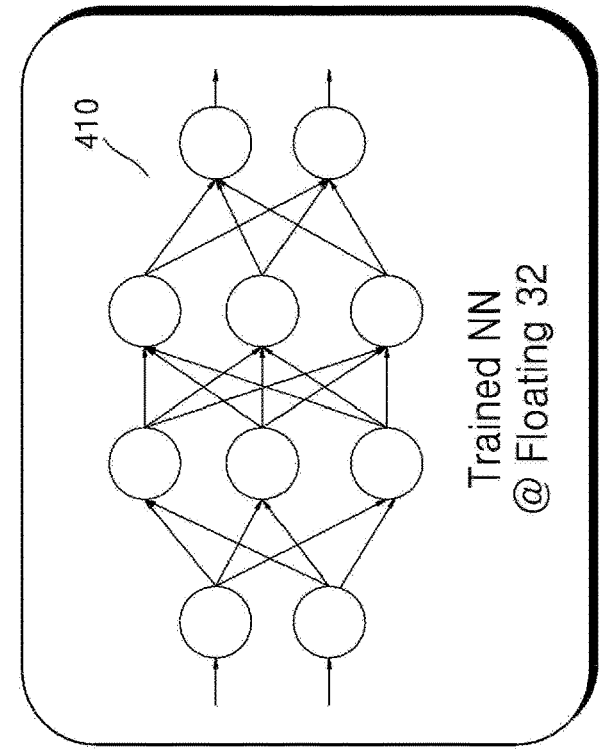

FIG. 5
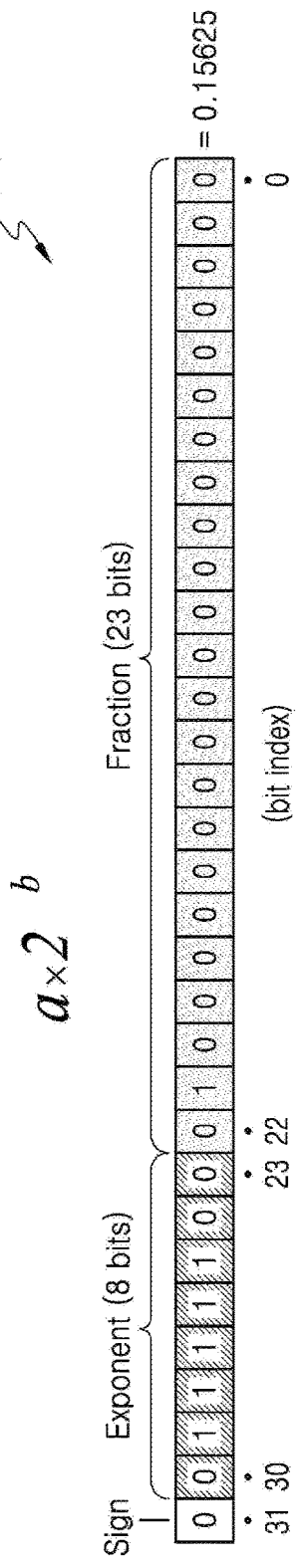
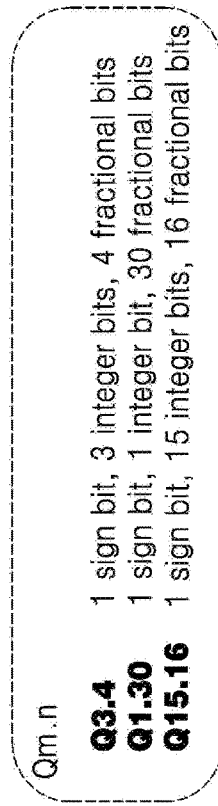
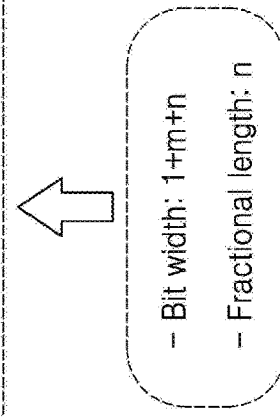
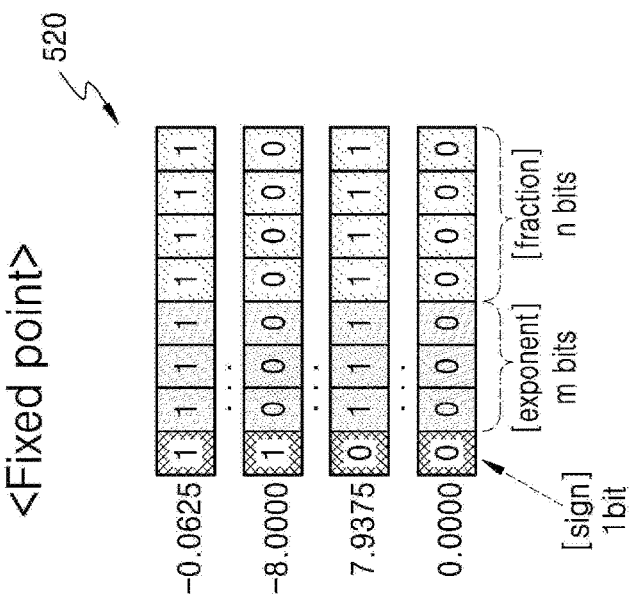

FIG. 8B

| CYCLE | WEIGHT DIFFERENCE FOR EACH LAYER ($W_{diff}$) | | | | |
|---|---|---|---|---|---|
| | Layer 1 | Layer 2 | $\cdots$ | Layer N-1 | Layer N |
| 1 | $W_{1[1]} - W_1$ | $W_{2[1]} - W_2$ | $\cdots$ | $W_{N-1[1]} - W_{N-1}$ | $W_{N[1]} - W_N$ |
| 2 | $W_{1[2]} - W_1$ | $W_{2[2]} - W_2$ | $\cdots$ | $W_{N-1[2]} - W_{N-1}$ | $W_{N[2]} - W_N$ |
| $\vdots$ | $\vdots$ | $\vdots$ | $\vdots$ | $\vdots$ | $\vdots$ |
| K-1 | $W_{1[K-1]} - W_1$ | $W_{2[K-1]} - W_2$ | $\cdots$ | $W_{N-1[K-1]} - W_{N-1}$ | $W_{N[K-1]} - W_N$ |
| K | $W_{1[K]} - W_1$ | $W_{2[K]} - W_2$ | $\cdots$ | $W_{N-1[K]} - W_{N-1}$ | $W_{N[K]} - W_N$ |

830

METHOD AND APPARATUS FOR NEURAL NETWORK QUANTIZATION

CROSS-REFERENCE TO RELATED APPLICATION

This application claims the benefit of Korean Patent Application No. 10-2019-0002986, filed on Jan. 9, 2019, in the Korean Intellectual Property Office, the disclosure of which is incorporated herein in its entirety by reference.

BACKGROUND

1. Field

The present disclosure relates to methods and apparatuses for adjusting precision of some selected layers of a neural network to a lower bit.

2. Description of Related Art

Neural networks are specialized refers to a computational architecture, which after substantial training may provide computationally intuitive mappings between input patterns and output patterns. An apparatus for processing a neural network performs a large number of operations on complex input that makes it difficult to analyze a large amount of input data and extract desired information using a neural network in real time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method for neural network quantization, the method including performing feedforward and backpropagation learning for a plurality of cycles on a first neural network having a first bit precision, obtaining weight differences between an initial weight and an updated weight determined by the learning of each cycle for each of layers in the first neural network, analyzing a statistic of the weight differences for each of the layers, determining one or more layers, from among the layers, to be quantized with a second bit precision lower than the first bit precision, based on the analyzed statistic, and generating a second neural network by quantizing the determined one or more layers with the second bit precision.

The statistic may include a mean square of weight differences for the each of the layers.

The method may include sorting the layers in order of a size of the analyzed statistic, wherein the determining of the one or more layers to be quantized may include identifying layers having a relatively small analyzed statistic size from among the sorted layers.

The determining of the one or more layers to be quantized may include identifying the one or more layers to be quantized using a binary search algorithm, in response to an accuracy loss of a neural network being within a threshold in comparison with the first neural network when some layers among the sorted layers are quantized with the second bit precision.

The accuracy loss may include a recognition rate of the neural network.

The determining of the one or more layers to be quantized may include determining a number of layers from among the sorted layers to be the one or more layers in ascending order of the size of the analyzed statistic.

The determining of the one or more layers to be quantized may include not determining a layer having the smallest analyzed statistic size from among the sorted layers to be the one or more layers to be quantized.

The first neural network may have layers of fixed point parameters of the first bit precision and is quantized from a third neural network having layers of floating point parameters of a third bit precision that is higher than the first bit precision, and the quantized second neural network may include the determined one or more layers have fixed-point parameters of the second bit precision and other layers with the fixed-point parameters of the first bit precision.

The method may include quantizing the layers other than the one or more layers, to layers of fixed-point parameters of a fourth bit precision that is lower than the first bit precision and higher than the second bit precision, in response to the first neural network having layers of floating-point parameters of the first bit precision, wherein the quantized second neural network may include the determined one or more layers having fixed-point parameters of the second bit precision and the layers have fixed-point parameters of the fourth bit precision.

In another general aspect, there is provided a n apparatus for neural network quantization, the apparatus including a processor configured to perform feedforward and backpropagation learning for a plurality of cycles on a first neural network having a first bit precision, obtain weight differences between an initial weight and an updated weight determined by the learning of each cycle for each of layers in the first neural network, analyze a statistic of the weight differences for each of the layers, determine one or more layers, from among the layers, to be quantized with a second bit precision lower than the first bit precision, based on the analyzed statistic, and generate a second neural network by quantizing the determined one or more layers with the second bit precision.

The statistic may include a mean square of weight differences for the each of the layers.

The processor may be configured to sort the layers in order of a size of the analyzed statistic, and determine layers having relatively small analyzed statistic size from among the sorted layers to be the one or more layers to be quantized.

The processor may be configured to determine the one or more layers to be quantized using a binary search algorithm, in response to an accuracy loss of a neural network being within a threshold in comparison with the first neural network when some layers among the sorted layers are quantized with the second bit precision.

The accuracy loss may include a recognition rate of the neural network.

The processor may be configured to determine a number of layers from among the sorted layers to be the one or more layers in ascending order of the size of the analyzed statistic.

The processor may be configured to not determine a layer having the smallest analyzed statistic size from among the sorted layers to be the one or more layers to be quantized.

The first neural network may have layers of fixed point parameters of the first bit precision and is quantized from a third neural network having layers of floating point parameters of a third bit precision that is higher than the first bit precision, and the quantized second neural network may include the determined one or more layers have fixed-point parameters of the second bit precision and other layers with the fixed-point parameters of the first bit precision.

The processor may be configured to quantize layers other than the one or more layers, to layers of fixed-point parameters of a fourth bit precision that is lower than the first bit precision and higher than the second bit precision, in response to the first neural network having layers of floating-point parameters of the first bit precision, and the quantized second neural network may include the determined one or more layers having fixed-point parameters of the second bit precision and the layers have fixed-point parameters of the fourth bit precision.

The apparatus may include a memory storing instructions that, when executed, configures the processor to perform the learning, obtain the weight differences, analyze the statistic, determine the one or more layers, and generate the second neural network.

Other features and aspects will be apparent from the following detailed description, the drawings, and the claims.

BRIEF DESCRIPTION OF THE DRAWINGS

FIG. 4 illustrates an example in which a learned neural network is quantized by a neural network quantization apparatus and deployed by a hardware accelerator.

FIG. 5 illustrates examples of a floating-point value and fixed-point values.

FIG. 8B is a diagram illustrating an example of a weight difference for each layer.

Figure 1:
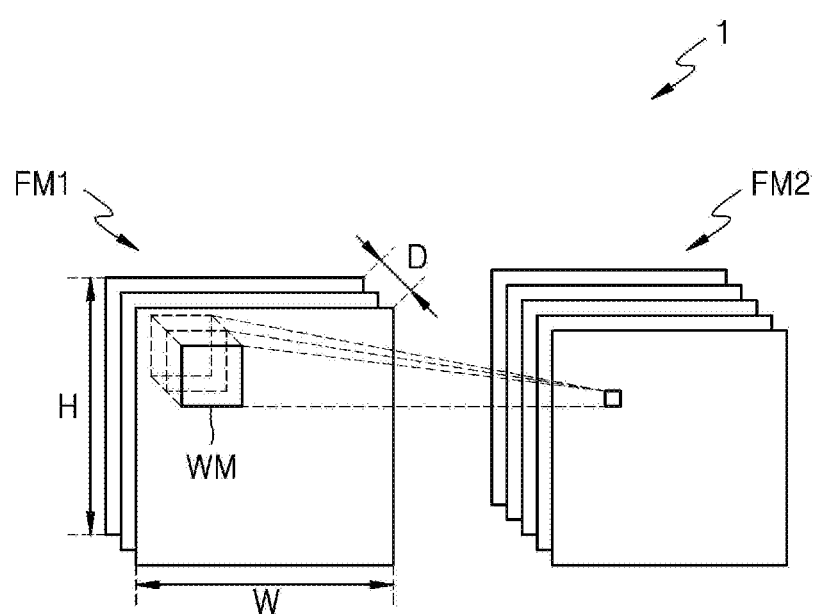
FIG. 1 is a diagram illustrating an example of an architecture of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. Throughout the disclosure, the expression "at least one of a, b or c" indicates only a, only b, only c, both a and b, both a and c, both b and c, all of a, b, and c, or variations thereof. The use of the term 'may' herein with respect to an example or embodiment, e.g., as to what an example or embodiment may include or implement, means that at least one example or embodiment exists where such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram illustrating an example of an architecture of a neural network 1.

Referring to FIG. 1, the neural network 1 may be a deep neural network (DNN) or an n-layer neural network. A DNN or an n-layer neural network may correspond to neural networks such as, for example, a convolutional neural network (CNN), a recurrent neural network (RNN), a deep belief network, a restricted Boltzman machine, a fully-connected network (FCN), a deep convolutional network (DCN), a long-short term memory (LSTM) network, and a gated recurrent units (GRUs). For example, the neural network 1 may be implemented as a CNN, but is not limited thereto. When the neural network 1 of FIG. 1 represents a CNN, the neural network 1 corresponds to some layers of the CNN. Accordingly, the neural network 1 may correspond to a convolutional layer, a pooling layer, or a fully connected layer of the CNN.

In the convolutional layer, a first feature map FM1 is an input feature map, and a second feature map FM2 is an output feature map. A feature map is a set of data expressing various features of input or output data. The feature maps FM1 and FM2 may be high-dimensional matrices of two or more dimensions, and each may include activation parameters. When the feature maps FM1 and FM2 are for example, three-dimensional feature maps, each of the feature maps FM1 and FM2 may have a width W (or a number of columns), a height H (or a number of rows), and a depth D. In an example, the depth D may correspond to a number of channels.

In the convolutional layer, a convolution operation is performed between the first feature map FM1 and a weight map WM to generate the second feature map FM2. The weight map WM filters the first feature map FM1, and may be referred to as a filter or a kernel. The depth of the weight map WM, that is, the number of channels of the weight map WM, is equal to a product of the depth of the first feature map FM1 and the depth of the second feature map FM2, that is a product of the number of channels of the first feature map FM1 and the number of channels of the second feature map FM2. In an example, the weight map WM is shifted to slide over an entire area of the first feature map FM1, acting as a sliding window. Each time the weight map WM is shifted, each of the weights included in the weight map WM is multiplied by a feature value of the first feature map FM1 at a corresponding position in an area of the first feature map FM1 overlapped by the weight map WM. The products of all of the multiplications are added together to obtain a corresponding feature value of the second feature map FM2 at a position corresponding to the position of the weight map WM. As the first feature map FM1 and the weight map WM are convolved with each other, a channel of the second feature map FM2 is generated. Although FIG. 1 illustrates one weight map WM, in actuality a plurality of weight maps are convolved with the first feature map FM1 to generate a plurality of channels of the second feature map FM2. Zero padding may be added around the border of the first feature map FM1 and the border of the second feature map FM2 when desirable. However, for simplicity, a detailed discussion of the zero padding has been omitted.

The second feature map FM2 of the convolution layer may be an input feature map of a next layer. For example, the second feature map FM2 may be an input feature map of a pooling layer.

Figure 2:
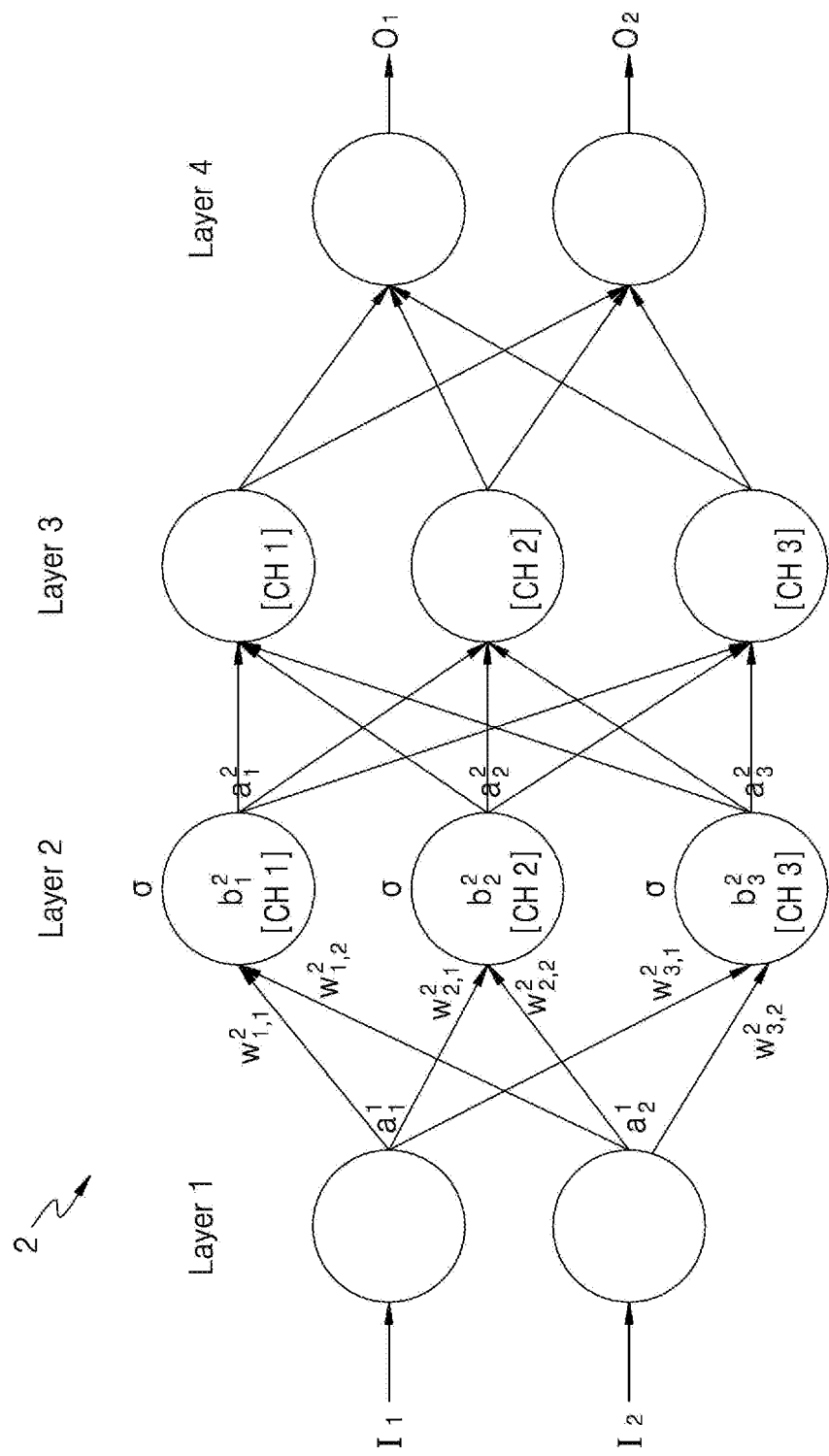
FIG. 2 is a diagram illustrating an example of an operation performed in a neural network.

FIG. 2 is a diagram illustrating an example of an operation performed in a neural network 2.

Referring to FIG. 2, a neural network 2 has a structure of including an input layer, hidden layers, and an output layer, performs an operation based on received input data, for example, $I_1$ and $I_2$, and generates output data, for example, $O_1$ and $O_2$, based on a result of the operation.

The neural network 2 may be, as described above, a DNN or an n-layer neural network including two or more hidden layers. In the example illustrated in FIG. 2, the neural network 2 is a DNN including an input layer Layer 1, two hidden layers Layer 2 and Layer 3, and an output layer Layer 4. When the neural network 2 is implemented by a DNN, the neural network 2 includes multiple hidden layers for effectively processing information, which enables the neural network 2 to process more complicated data sets than a neural network having a single hidden layer. Although the neural network 2 is illustrated as including four layers, this is merely an example, and the neural network 2 may include more or fewer layers, or more or fewer channels. In other words, the neural network 2 may include layers having various structures different from the structure illustrated in FIG. 2.

Each of the layers included in the neural network 2 includes a plurality of channels. The channels correspond to a plurality of artificial nodes also known as neurons, processing elements (PE), units, or other terms. For example, as illustrated in FIG. 2, each of Layer 1 and Layer 4 includes two channels (nodes), and each of Layer 2 and Layer 3 includes three channels (nodes). However, this is merely an example, and each of the layers included in the neural network 2 may include other numbers of channels (nodes).

The channels in the layers of the neural network 2 are connected to channels in other layers to process data. For example, one channel may receive data from other channels, perform an operation on the data, and output an operation result to other channels.

The input of each of the channels may be referred to as an input activation, and the output of each of the channels may be referred to as an output activation. In other words, an activation is a parameter that is an output of one channel and is simultaneously an input of one or more other channels included in the next layer. Each of the channels determines its own activation based on the activations received from channels included in the previous layer and the weights. A weight is a parameter used to calculate an output activation in each channel, and is a value allotted to a connection between two channels.

Each of the channels is processed by a computational unit or a processing element that receives an input activation and outputs an output activation, and the input activation and the output activation of each of the channels are respectively mapped to input feature map and an output feature map. For example, when "σ" denotes an activation function, "$w_{jk}^i$" denotes a weight from a k-th channel included in an (i−1)-th layer to a j-th channel included in an i-th layer, "$a_k^{i-1}$" denotes an output activation of the k-th channel included in the (i−1)-th layer, which is also an input activation of the j-th channel included in the i-th layer, $b_j^i$" denotes a bias of the j-th channel included in the i-th layer, and "$a_j^i$" denotes an output activation of the j-th channel included in the i-th layer, the output activation $a_j^i$ may be calculated according to Equation 1 below.

$$a_j^i = \sigma\left(\sum_k \left(w_{jk}^i \times a_k^{i-1}\right) + b_j^i\right) \qquad 1$$

As illustrated in FIG. 2, an output activation of the first channel CH 1 of the second layer Layer 2 is denoted by "$a_1^2$". Furthermore, "$a_1^2$" has a value of "$a_1^2=\sigma(w_{1,1}^2 \times a_1^1 + w_{1,2}^2 \times a_2^1 + b_1^2)$" according to Equation 1. However, the above-described Equation 1 is merely an example for describing the activations, weights, and bias used to process data in the neural network 2, and the neural network 2 is not limited thereto. For example, the activation may be a value obtained by passing, through a rectified linear unit (ReLU), a value obtained by applying an activation function to a sum of activations received from a previous layer.

As described above, in the neural network 2, numerous data sets are exchanged between a plurality of channels interconnected with one another, and undergo numerous operations while passing through layers. Described below, are methods and apparatuses that decrease the number of operations needed to process complicated input data and simultaneously reduce a loss of accuracy of the neural network 2.

Figure 3:
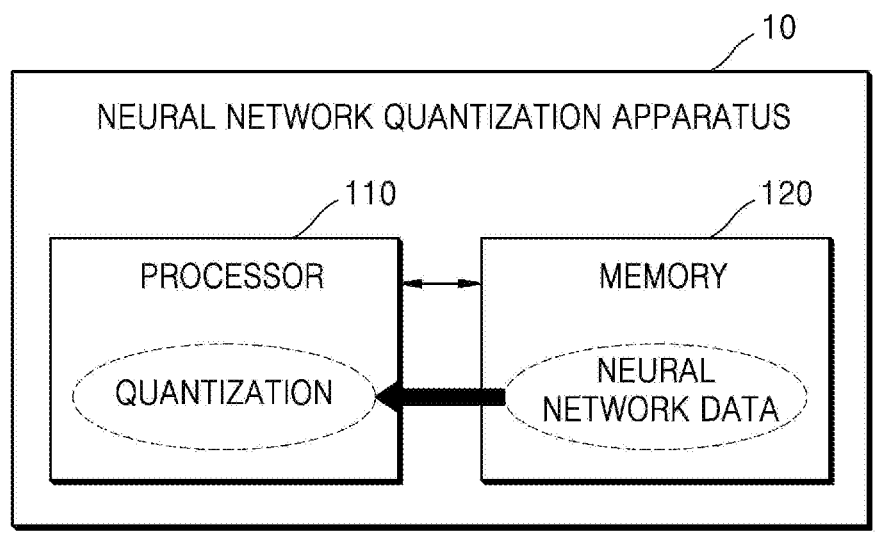
FIG. 3 is a diagram illustrating an example of a hardware configuration of a neural network quantization apparatus.

FIG. 3 is a diagram illustrating an example of a hardware configuration of a neural network quantization apparatus 10.

Referring to FIG. 3, a neural network quantization apparatus 10 includes a processor 110 and a memory 120. In the neural network quantization apparatus 10 of FIG. 3, only constituent elements related to the example of FIG. 3 are illustrated for convenience of description. However, the neural network quantization apparatus 10 may further include common constituent elements in addition to the constituent elements illustrated in FIG. 3.

The neural network quantization apparatus 10 is a computing device having various processing functions such as functions to generate a floating-point neural network, train the floating-point neural network, quantize the floating-point neural network to obtain a fixed-point neural network, and retrain the fixed-point neural network. For example, the neural network quantization apparatus 10 may be implemented in various types of devices such as, for example, a server, a mobile device, a smart phone an embedded device, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, voice authentication systems, an augmented reality (AR) device, an Internet of Things (IoT) device, an autonomous vehicle, a robotic device, or a medical device, which performs voice recognition, image recognition, and image classification using a neural network, but is not limited thereto. The neural network quantization apparatus 10 may be applicable to vehicles and vehicle management systems such as, for example, an autonomous vehicle, an automatic or autonomous driving system, an intelligent vehicle, an advanced driver assistance system (ADAS), a navigation system to assist a vehicle with safely maintaining a lane on which the vehicle is travelling. The examples described herein may be used for road guidance information in a navigation device of a vehicle, such as, for example, an augmented reality head-up display (AR 3D HUD). Furthermore, the neural network quantization apparatus 10 may be a dedicated hardware accelerator mounted in the above-mentioned devices, and the neural network quantization apparatus 10 may be a hardware accelerator, such as, for example, a neural processing unit (NPU), a tensor processing unit (TPU), a neural engine, which is a dedicated module for driving a neural network, although not limited thereto. The examples described above are non-limiting, and other examples such as, for example, training, gaming, applications in healthcare, public safety, tourism, and marketing are considered to be well within the scope of the present disclosure. These devices perform one or more functions such as, for example, voice recognition, image recognition, and image classification, and the neural network quantization apparatus 10 may be also provided for other types of devices.

The processor 110 performs functions to control the neural network quantization apparatus 10. For example, the processor 110 controls all functions of the neural network quantization apparatus 10 by executing one or more programs stored in the memory 120. The processor 110 is included in or includes at least one of the apparatuses described with reference to FIGS. 3-4 and 18 or performs at least one of the methods described with reference to FIGS. 11-15 and 19. The processor 110 refers to a data processing device configured as hardware with a circuitry in a physical structure to execute desired operations. For example, the desired operations may include codes or instructions included in a program. For example, the processor 110 may be embodied as a microprocessor, a processor core, a multicore processor, a multiprocessor, a central processing unit (CPU), a graphics processing unit (GPU), an application processor (AP), an application-specific integrated circuit (ASIC), and a field programmable gate array (FPGA) included in the neural network apparatus 100, but is not limited thereto. Also, the processor 110 may execute programs stored in the memory 120 to control all operations of the neural network apparatus 100. For example, the processor 110 may be implemented as a microprocessor (MCU) in which a CPU, a memory (Read Only Memory (ROM) or Radom Access Memory (RAM)), etc. are installed in a single chip, although not limited thereto. Further details regarding the processor 110 are provided below.

The memory 120 is hardware for storing various pieces of data processed in the neural network quantization apparatus 10. For example, the memory 120 may store data that has been processed and data that is to be processed in the neural network quantization apparatus 10. Furthermore, the memory 120 may store applications and drivers to be executed by the neural network quantization apparatus 10. The memory 120 may be DRAM, but is not limited thereto. The memory 120 may include either one or both of volatile memory and nonvolatile memory. Examples of the nonvolatile memory include read-only memory (ROM), programmable ROM (PROM), electrically programmable ROM (EPROM), electrically erasable and programmable ROM (EEPROM), flash memory, phase-change random-access memory (RAM) (PRAM), magnetic RAM (MRAM), resistive RAM (RRAM), and ferroelectric RAM (FeRAM). Examples of the volatile memory include dynamic RAM (DRAM), static RAM (SRAM), synchronous DRAM (SDRAM), PRAM, MRAM, RRAM, and ferroelectric RAM (FeRAM). In one example, the memory 120 may include any one or any combination of any two or more of a hard disk drive (HDD), a solid-state drive (SSD), a CompactFlash (CF) card, a Secure Digital (SD) card, a Micro Secure Digital (microSD) card, a Mini Secure Digital (miniSD) card, an eXtreme Digital Picture (xD-Picture) card, and a Memory Stick. Further details regarding the memory 120 are provided below.

The processor 110 generates a trained neural network by repeatedly training an initial neural network. To ensure accurate calculations, in an example, the initial neural network has floating-point parameters, for example, parameters of 32-bit floating-point precision. The parameters include various types of data input to and output from the neural network, for example, input activations, weights, biases, and output activations of a neural network. As the training of the neural network is repeated, the floating-point parameters of the neural network are tuned or updated to produce a more accurate output for a given input. However, the present disclosure is not limited thereto, and the learning of a neural network may be performed by using a quantized neural network after neural network quantization to be described below is performed.

A relatively large number of operations and relatively frequent memory accesses are needed for floating-point parameters compared to fixed-point parameters. Accordingly, in mobile devices such as smart phones, tablets, and wearable devices, and embedded devices that have a relatively low processing performance, processing of a neural network having floating-point parameters may not be optimal. As a result, to drive a neural network within an allowable accuracy loss while sufficiently reducing a number of operations in the devices, the floating-point parameters of the trained neural network are quantized. In this application, "quantization of parameters" refers to a conversion of floating-point parameters to fixed-point parameters. Accordingly, in an example, quantizing any layer included in a neural network may signify quantizing a parameter of the layer.

In an example, the neural network quantization apparatus 10 performs quantization of floating-point parameters of a trained neural network to fixed-point parameters having a certain number of bits, considering processing performance of a device, for example, a mobile device or an embedded device, that deploys the neural network, and the neural network quantization apparatus 10 transmits a quantized neural network to the device that deploys the neural network. The device that deploys the neural network may be any of the devices listed above, such as, for example, an autonomous vehicle, a smart phone, a tablet device, an augmented reality (AR) device, or an Internet of Things (IoT) device that performs voice recognition or image recognition using a neural network, but the device is not limited thereto.

In an example, the processor 110 acquires data of a pre-trained floating-point neural network stored in the memory 120. The pre-trained neural network is implemented by data that has been repeatedly trained with floating-point parameters. The neural network may be trained by repeatedly inputting training set data first and then repeatedly inputting test set data, but the training is not limited thereto. The training set data is input data for performing initial training of the neural network, and the test set data is input data that is independent of the training set data for performing additional training of the neural network to increase an accuracy of the neural network. During both the initial training and the additional training, the performance of the neural network is measured and the training is continued until a desired accuracy is obtained.

Quantizing, which is performed by the processor 110, each layer of a neural network to a fixed point type is described in detail with reference to the drawings.

The memory 120 stores neural network-related data sets that have been processed or are to be processed by the processor 110, for example, data of an untrained initial neural network, data of a neural network generated in a training process, data of a neural network for which training has been completed, and data of a quantized neural network. Also, the memory 120 stores various programs related to training algorithms and quantization algorithms of a neural network to be executed by the processor 110.

FIG. 4 illustrates an example in which a learned neural network is quantized by a neural network quantization apparatus and deployed by a hardware accelerator.

Referring to FIG. 4, as described above, in the neural network quantization apparatus (10 of FIG. 3) such as a PC or a server, the processor (110 of FIG. 3), which may be a GPU, learns a floating-point neural network 410, for example, a 32-bit floating-point neural network. The neural network 410 that is learned cannot be efficiently processed in a low power or low performance hardware accelerator because of its floating-point parameters. Accordingly, the processor 110 of the neural network quantization apparatus 10 quantizes the floating-point neural network 410 to a fixed-point neural network 420, for example, a 16-bit or low fixed-point type. The hardware accelerator is dedicated hardware for driving the neural network 420. Since the hardware accelerator is implemented with relatively low power or low performance hardware, it may be optimized for a fixed-point operation rather than a floating-point operation. The hardware accelerator may be, for example, a neural processing unit (NPU), a tensor processing unit (TPU), or a neural engine, which are dedicated devices for driving a neural network, but the hardware accelerator is not limited thereto.

In an example, the hardware accelerator for driving the quantized neural network 420 may be implemented in a separate device that is independent of the neural network quantization apparatus 10. However, the hardware accelerator is not limited thereto, and the hardware accelerator may be implemented in the same device as the neural network quantization apparatus 10.

FIG. 5 illustrates examples of a floating-point value and fixed-point values.

Referring to FIG. 5, a floating-point value 510 is expressed as "a×2$^b$", in which "a" is a fractional part and "b" is an exponent part. The floating-point value 510 is expressed by 32 bits including a 1-bit sign part, an 8-bit exponent part, and a 23-bit fractional part.

Furthermore, fixed-point values 520 are expressed by "Qm.n", where m and n are natural numbers. In the expression "Qm.n", "m" denotes the number of bits indicating the exponent part, and "n" denotes the number of bits indicating the fractional part. Accordingly, a bit width of a fixed-point value is (1+m+n) obtained by summing a 1-bit sign part, an m-bit exponent part, and an n-bit fractional part. Since bits of the fixed-point bits indicating the fractional part are n bits, a fractional length is n. For example, "Q3.4" is a total 8-bit fixed-point value including a 1-bit sign part, a 3-bit exponent part, and a 4-bit fractional part, "01.30" is a total 32-bit fixed-point value including a 1-bit sign part, a 1-bit exponent part, and a 30-bit fractional part, and "015.16" is a total 32-bit fixed-point value including a 1-bit sign part, a 15-bit exponent part, and a 16-bit fractional part.

Figure 6:
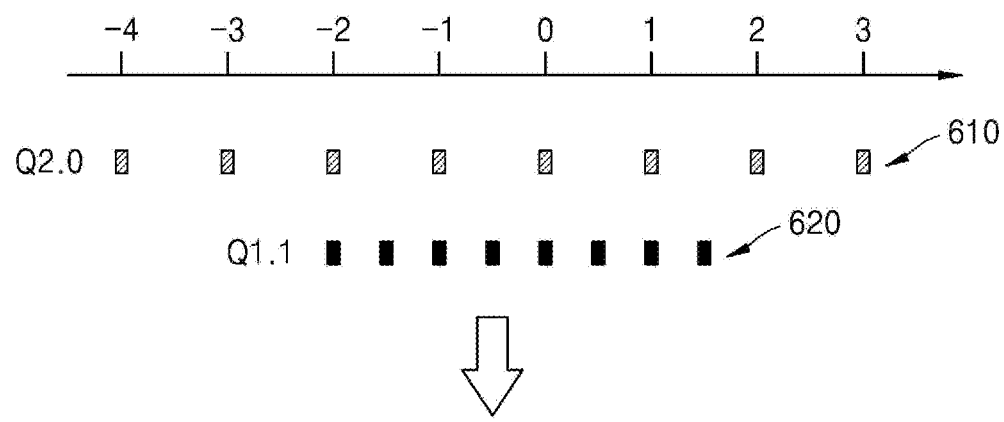
FIG. 6 is a diagram illustrating an example of a relationship between fractional length and accuracy in a fixed point.

FIG. 6 illustrates an example of a relationship between fractional length and accuracy of a fixed-point value.

Referring to FIG. 6, assuming that the total bit width allotted to a fixed-point value is 3 bits, a fixed-point expression 610 of Q2.0 in which the fractional length is 0 and a fixed-point expression 620 of Q1.1 in which the fractional length is 1 are compared to each other.

For Q2.0, since the exponent part is 2 bits and the fractional part is 0 bits, fixed-point values from −4 to 3 may be expressed, and an interval between the possible fixed-point values is 1. For Q1.1, since the exponent part is 1 bit and the fractional part is 1 bit, fixed-point values from −2 to 1.5 may be expressed, and an interval between the possible fixed-point values is 0.5.

As can be seen from the comparison, although 3 bits are allotted to both the fixed-point expression 610 of Q2.0 and the fixed-point expression 620 of Q1.1, Q2.0 is able to express a wider range of fixed-point values than Q1.1., but has a lower accuracy because the interval between the fixed-point values is wider. Q1.1 is able to express a narrower range of fixed-point values than Q2.0, but has a higher accuracy because the interval between the fixed-point values is narrower. Consequently, it may be seen that the accuracy of a fixed-point value depends on the fractional length of the fixed-point value, that is, the number of fractional bits allotted to the fixed-point value.

Figure 7:
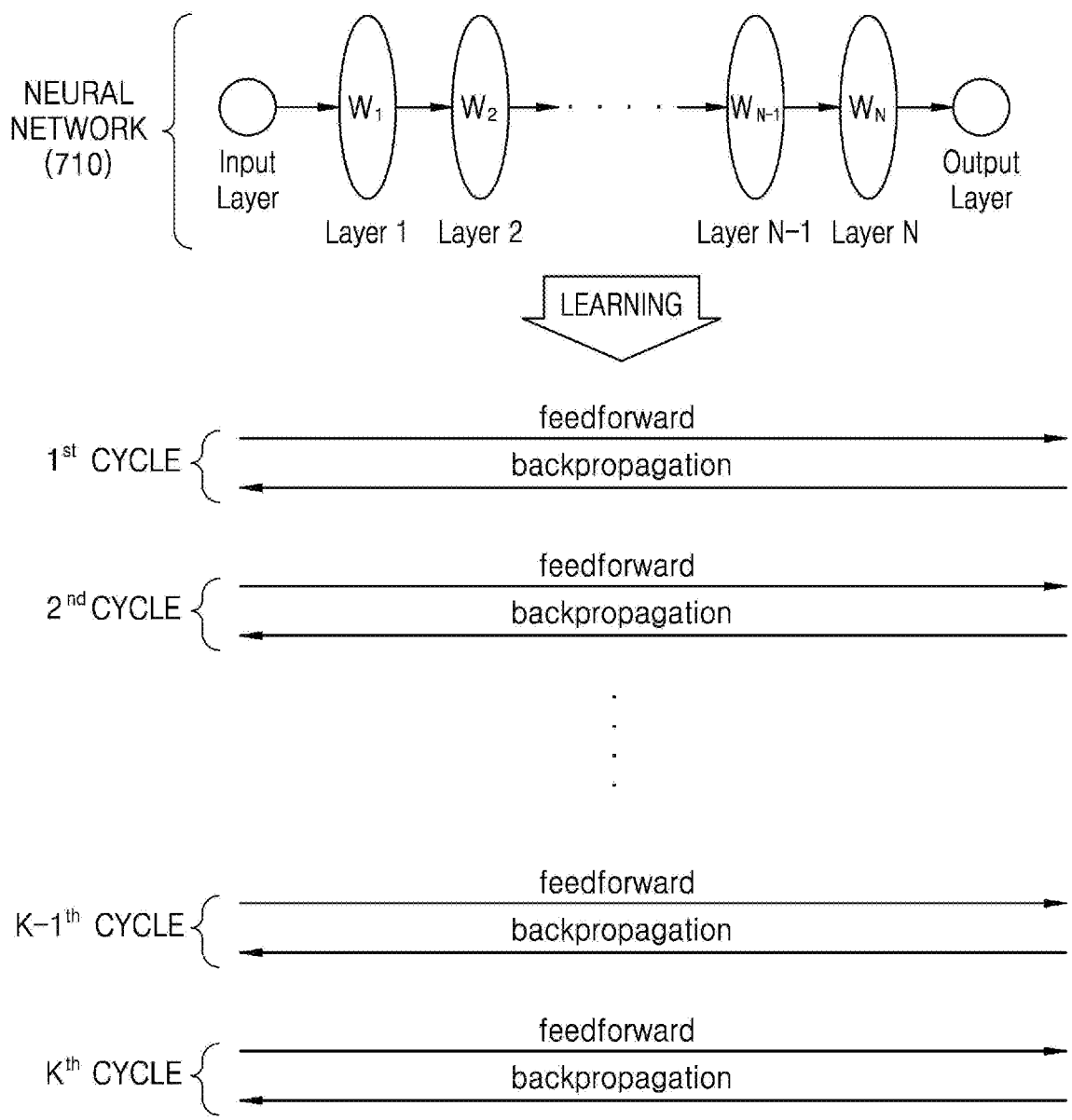
FIG. 7 is a diagram illustrating an example of learning of a neural network.

FIG. 7 is a diagram illustrating an example describing learning of a neural network 710.

Referring to FIG. 7, the neural network 710 may include an input layer, N-number of layers (Layer 1, Layer 2, . . . , Layer N-1 and Layer N), where N is a natural number, and an output layer. In this regard, a weight is assigned to each of N-number of layers. In other words, a weight 1 $W_1$ may be assigned to Layer 1, a weight 2 $W_2$ may be assigned to Layer 2, . . . , a weight N-1 $W_{N-1}$ may be assigned to Layer N-1, and a weight N $W_N$ may be assigned to Layer N. In FIG. 2, it is described that a plurality of channels may be provided in a layer. The weight assigned to each layer that is described in FIG. 7 may correspond to a value representing the weights of one or more channels included in each layer.

Identification numbers of layers of a neural network are for distinguishing the respective layers in the drawings, and the interpretation of the embodiments does not limit the layer identification number. Accordingly, even when layers indicated by the same identification number exist in different drawings, this is merely for convenience of explanation, and the identification number may refer to the same layer or different layers.

In an example, the processor 110 of FIG. 3 repeatedly performs feedforward learning and backpropagation learning on the neural network 710 by a plurality of cycles, for example, K cycles, where K is a natural number.

The neural network 710 may obtain recognition accuracy or a recognition rate of the neural network 710 through feedforward learning, and propagate an error of the neural network 710 to each layer through backpropagation learning. The error of the neural network 710 may signify an error related to biases or weights included in each layer. Accordingly, as errors of layers may be corrected through feedforward and backpropagation learning of repeated cycles (Cycle 1 to Cycle K), the recognition accuracy or recognition rate of the neural network 710 may be increased.

In an example, the layers of the learned neural network 710, i.e., parameters of layers are quantized to lower precision. For example, when the neural network 710 is a model having a 32-bit precision floating point, the learned neural network corresponds to a model having a 32-bit precision floating point. To adapt a neural network, the neural network 710 having a 32-bit precision floating point may be quantized to a neural network having a fixed point of 16 bits, 8 bits, or less. In this regard, even when the neural network is quantized, the neural network may efficiently operate with reduced accuracy loss. In the following description, in the neural network quantization process, a method of performing quantization on numerous layers in a neural network is described.

Figure 8A:
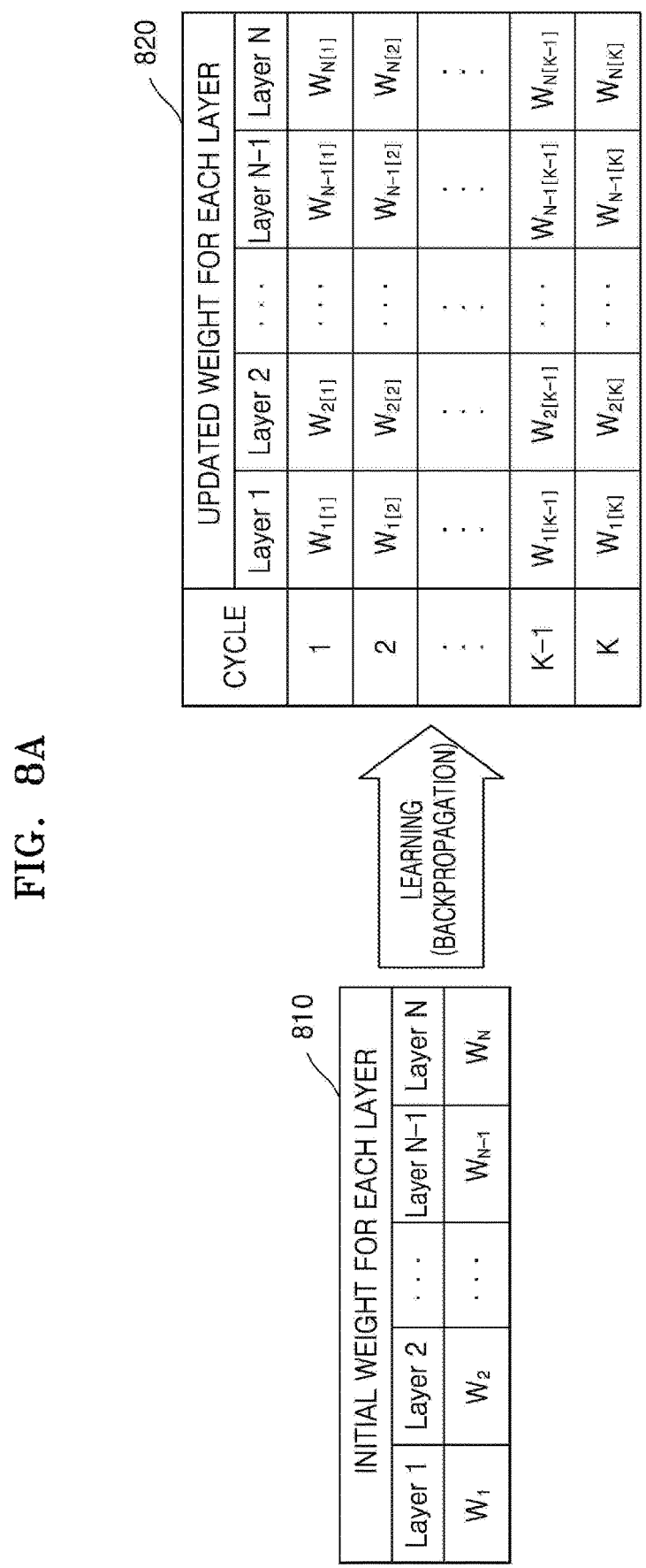
FIG. 8A is a diagram illustrating an example of weights updated by backpropagation learning of a neural network.

FIG. 8A is a diagram illustrating an example for describing weights updated by backpropagation learning of a neural network. Referring to FIG. 8A, a table 810 regarding initial weights for each layer and a table 820 regarding updated weight for each layer updated by backpropagation learning are illustrated.

In FIG. 7, an initial neural network before learning (710 of FIG. 7) includes Layer 1 to Layer N. According to the table 810, Layer 1 has a weight 1 $W_1$, Layer 2 has a weight 2 $W_2$, . . . , Layer N-1 has a weight N-1 $W_{N-1}$, and Layer N has a weight N $W_N$.

The processor 110 of FIG. 3 repeatedly learns the neural network 710 for a plurality of cycles, and the processor 110 determines updated weights according to the backpropagation learning at each cycle.

According to the table 820, as a result of the backpropagation learning at Cycle 1, the updated weight of Layer 1 is determined to be $W_{1[1]}$, the updated weight of Layer 2 is determined to be $W_{2[2]}$, . . . , the updated weight of Layer N-1 is determined to be $W_{N-1[1]}$, and the updated weight of Layer N is determined to be $W_{N[1]}$. Likewise, the processor 110 determines the updated weights of each layer as a result of the backpropagation learning at each of the other cycles upto the $K^{th}$ cycle.

FIG. 8B is a diagram illustrating an example for describing a weight difference for each layer.

A weight difference $W_{diff}$ signifies a difference value between the initial weight for each layer of a neural network before learning and an updated weight that is determined by backpropagation learning at each cycle for each layer.

In detail, referring to FIG. 8B, a table 830 regarding s weight difference $W_{diff}$ is illustrated. For example, regarding Layer 1, when learning of Cycle 1 is performed, a difference between the updated weight $W_{1[1]}$ of Layer 1 and the initial weight $W_1$ of Layer 1 corresponds to a weight difference obtained as a result of the learning of Cycle 1 for Layer 1. Likewise, the processor 110 of FIG. 3 obtains weight differences of the other layers and the other cycles.

Figure 8C:
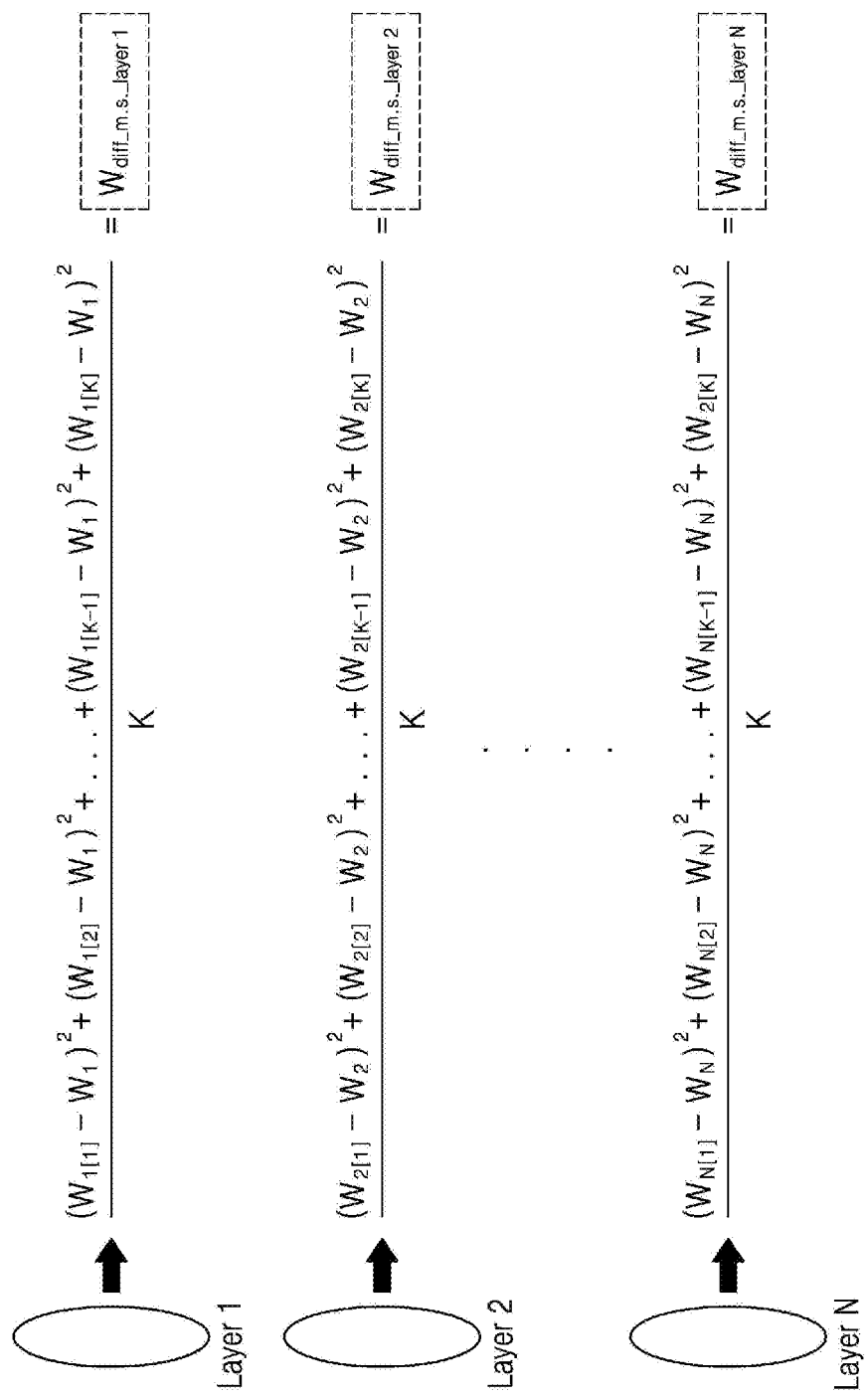
FIG. 8C is a diagram illustrating an example of a result of analysis of a statistic of weight differences for each layer.

FIG. 8C is a diagram illustrating an example for describing a result of analysis of a statistic of weight differences for each layer.

In the neural network quantization, as a value indicating a statistic of a weight difference $W_{diff}$ of layers decreases, quantization may be performed to a lower-bit precision. In this regard, the statistic of the weight difference $W_{diff}$ of layers may include a mean square of weight differences at all cycles for each layer, but the present disclosure is not limited thereto, and the statistic may be a different type of a statistic such as mean, variation, or standard deviation.

Referring to FIG. 8C, analysis of the statistic of the weight difference $W_{diff}$ for each layer is illustrated. In detail, regarding Layer 1, the processor 110 calculates a mean of the square $(W_{1[1]}-W_1)^2$ of the weight difference at Cycle 1, the square $(W_1[2]-W_1)^2$ of the weight difference at Cycle 2, . . . , the square $(W_{1[K]}-W_1)^2$ of the weight difference at Cycle K, thereby obtaining $W_{diff}$_m.s._Layer 1 that is the statistic, that is, a mean square, of the weight differences of Layer 1. Likewise, the processor 110 obtains the statistic, that is, a mean square, of the weight differences of other cycles.

The statistic of the weight differences for each layer may be used to determine and select layers to be quantized with a lower-bit precision in the neural network quantization.

Figure 9:
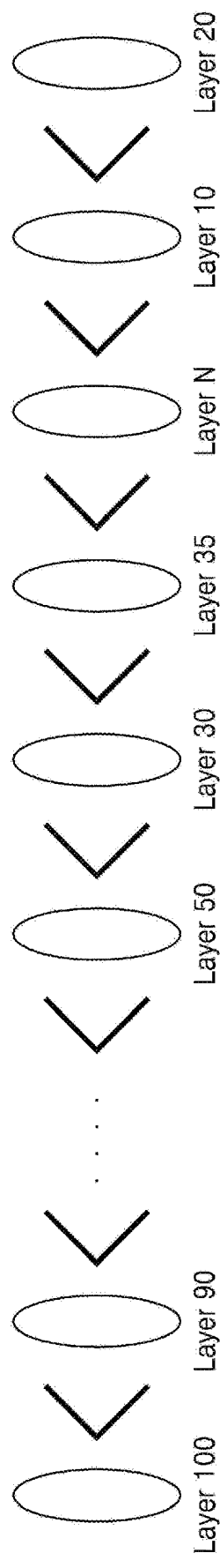
FIG. 9 is a diagram illustrating an example of sorting of layers based on a weight difference statistic.

FIG. 9 is a diagram illustrating an example for describing sorting of layers based on a weight difference statistic.

Referring to FIG. 9, the processor 110 of FIG. 3 may sort layers of a neural network in order of the size of a weight difference statistic, for example, a mean square, corresponding to each layer to determine layers to be quantized with a lower-bit precision. In other words, the processor 110 may sorts layers in order of the size based on sizes of $W_{diff}$_m.s._Layer 1, $W_{diff}$_m.s._Layer 2, . . . , $W_{diff}$_m.s._Layer N, which are the statistic of weight differences for each layer as analyzed in FIG. 8C. The sorting method may be either of ascending order and descending order.

Although FIG. 9 illustrates that N-number of layers, where N is a natural number, are sorted in ascending order of the size of the weight difference statistic, for example, a mean square, the identification number of each layer is indicated merely for convenience of explanation, and the present disclosure is not limited thereto.

The processor 110 may first sort the layers as described in FIG. 9 to select layers to be quantized with a lower-bit precision, but the present disclosure is not limited thereto. The processor 110 may select layers satisfying specific conditions based on the weight difference statistic, for example, a mean square, without sorting the layers.

Figure 10:
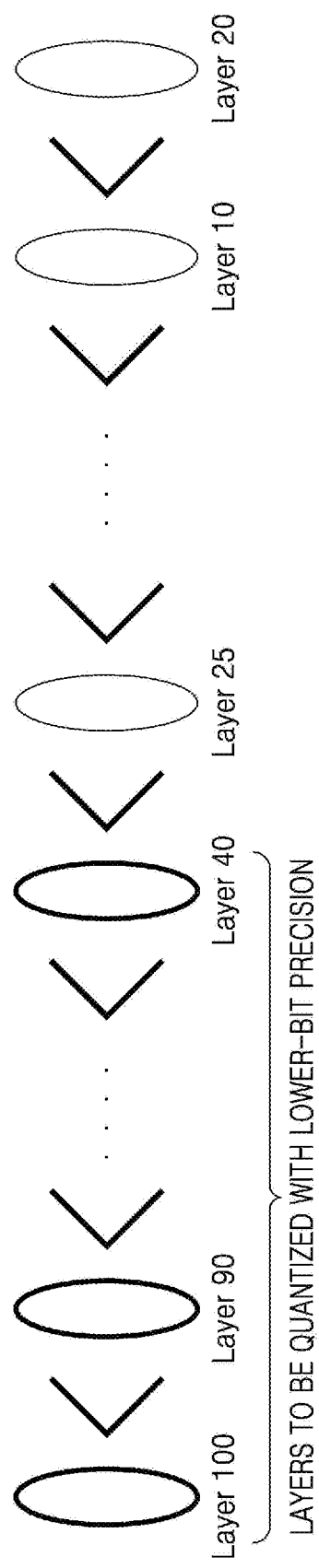
FIG. 10 is a diagram illustrating an example of selection of layers to be quantized with a lower-bit precision among the sorted layers.

FIG. 10 is a diagram illustrating an example for describing selection of layers to be quantized with a lower-bit precision among the sorted layers.

Referring to FIG. 10, the processor 110 of FIG. 3 determines layers (Layer 100, layer 90, . . . , layer 40) in which the size of the analyzed weight difference statistic is relatively small among all sorted layers, to be one or more layers to be quantized. The method of selecting layers in which the size of the weight difference statistic is relatively small is further described in detail with reference to FIGS. 11 and 12.

In an example, the processor 110 may not determine a layer (Layer 100) having the smallest analyzed statistic size to be one or more layers to be quantized. In an example, when the layer (Layer 100) having the smallest analyzed statistic size is quantized with a lower-bit precision, the number of classes to be expressed may decrease. However, the present disclosure is not limited thereto, and the processor 110 may quantize layers including the layer (Layer 100) having the smallest analyzed statistic size.

In FIG. 10, all of the sorted layers may correspond to the quantized layers of a neural network. In this regard, the layers quantized with a lower-bit precision may be layers quantized with an "A-bit precision", where A is a natural number, and the other layers may be layers quantized with a "B-bit precision", where B is a natural number. The A-bit precision is lower precision than the B-bit precision. In an example, the layers quantized with a lower-bit precision may correspond to the layers having the lowest precision among all quantized layers, but the present disclosure is not limited thereto.

As described above, the quantization of layers may be quantization of parameters such as biases or weights included in the layer, which may signify determining or changing of the fractional length of a fixed point parameter.

In the following description, a method of determining and selecting layers to be quantized with a lower-bit precision from among all layers or all sorted layers is described.

Figure 11:
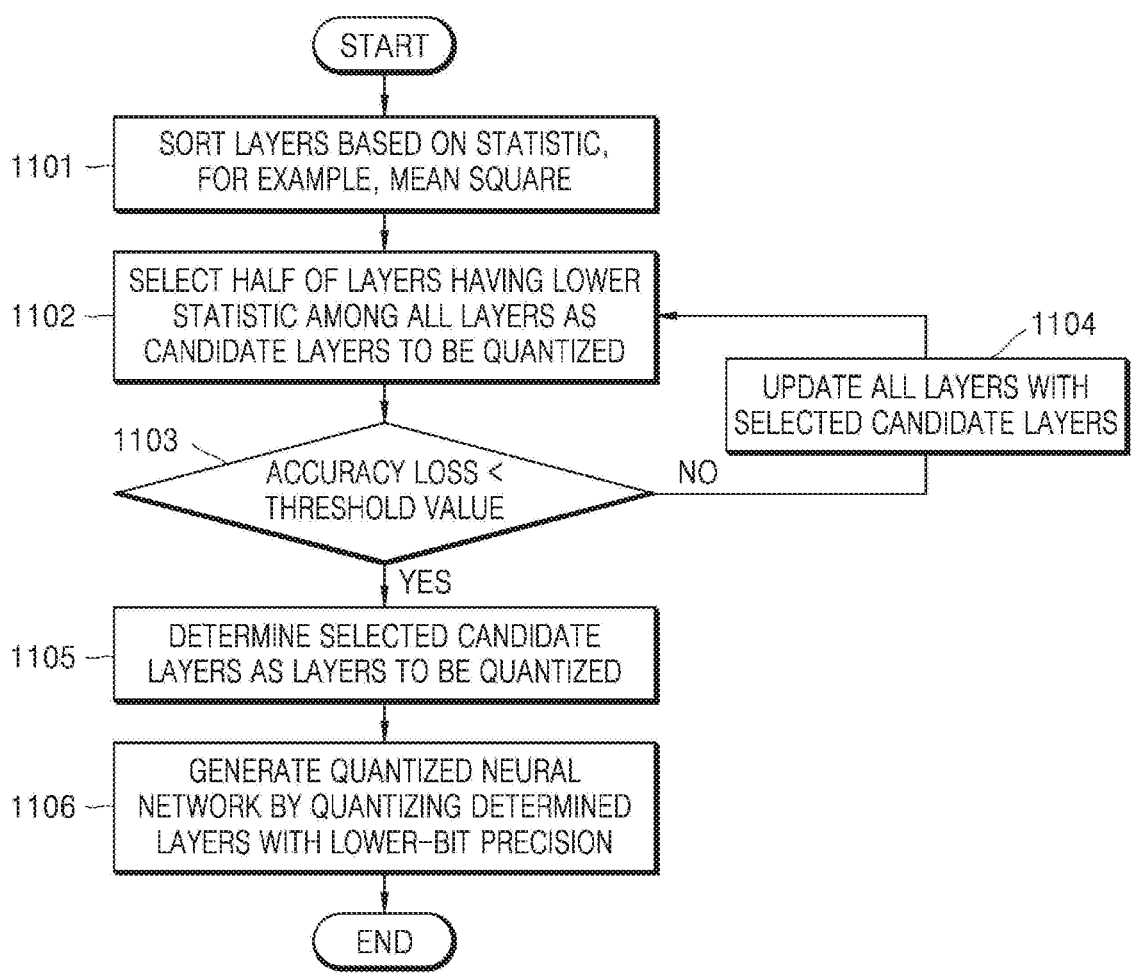
FIG. 11 is a diagram illustrating an example of a method of determining layers to be quantized with a lower-bit precision.

FIG. 11 is a diagram illustrating an example of a method of determining layers to be quantized with a lower-bit precision. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer, such as a processor, that perform the specified functions, or combinations of special purpose hardware and computer instructions. In an example, the operation of FIG. 11 may be performed by the neural network quantization apparatus 10 of FIG. 3. In addition to the description of FIG. 11 below, the descriptions of FIGS. 1-10 are also applicable to FIG. 11, and are incorporated herein by reference. Thus, the above description may not be repeated here.

In operation 1101, the processor 110 of FIG. 3 sorts layers of a neural network based on the analyzed weight difference statistic, for example, a mean square, as in FIGS. 8A to 8C. In other words, the processor 110 may sort layers in order of the size of the weight difference statistic, for example, a mean square, in ascending order or descending order.

In operation 1102, in an example, the processor 110 selects half of the layers having a lower statistic as candidate layers that are to be quantized with a lower-bit precision.

In operation 1103, when the selected candidate layers are quantized, the processor 110 determines whether accuracy loss of the quantized neural network is equal to or less than a threshold value. When the accuracy loss is equal to or less than the threshold value, the processor 110 performs operation 1105. When the accuracy loss is greater than the threshold value, the processor 110 performs operation 1104.

In operation 1104, as the accuracy loss of the quantized neural network is greater than the threshold value, the processor 110 again determines candidate layers that are to be quantized with a lower-bit precision. In an example, the processor 110 updates all layers with the selected candidate layers, in operation 1104. Accordingly, in operation 1102, the processor 110 may again determine the number of candidate layers from among all updated layers (half of that in the previous operation 1102).

In operation 1105, as the accuracy loss of the quantized neural network is equal to or less than the threshold value, the processor 110 determines the selected candidate layers as the layers to be quantized with a lower-bit precision.

In operation 1106, the processor 110 generates a quantized neural network by quantizing the determined layers with a lower-bit precision.

Referring to FIG. 11, in an example, a binary search algorithm is described as an embodiment for determining layers to be quantized with a lower-bit precision. The processor 110 of FIG. 3 determines, by using a binary search algorithm, whether the accuracy loss of a neural network including some layers that are quantized with an A-bit (lower-bit) precision from among the sorted layers is within the threshold value in comparison with a neural network including layers that are not quantized with the A-bit precision, thereby determining one or more layers to be quantized.

Although not illustrated in FIG. 11, in operation 1103, when the accuracy loss is greater than the threshold value, an operation of determining whether the number of candidate layers is equal to or less than a certain number, for example, five, which may be predefined by a user may be optionally added. When the optional operation is added, even when the accuracy loss is greater than the threshold value, the processor 110 may determine that the number of candidate layers is equal to or less than the number, for example, five, and perform operation 1105.

Figure 12:
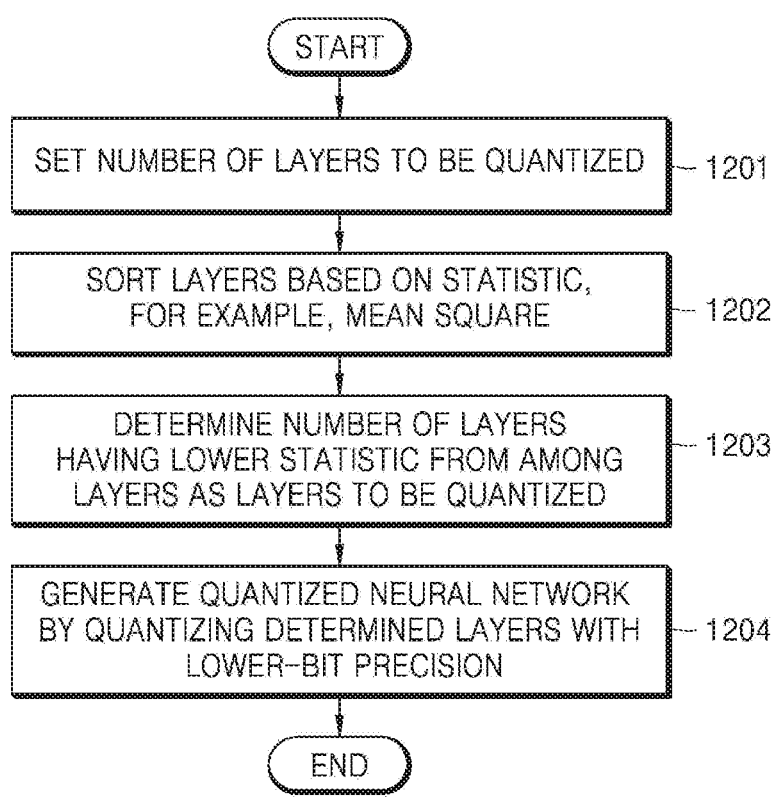
FIG. 12 is a diagram illustrating an example of a method of determining layers to be quantized with a lower-bit precision.

FIG. 12 is a diagram illustrating an example for describing a method of determining layers to be quantized with a lower-bit precision. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer, such as a processor, that perform the specified functions, or combinations of special purpose hardware and computer instructions. In an example, the operation of FIG. 12 may be performed by the neural network quantization apparatus 10 of FIG. 3. In addition to the description of FIG. 12 below, the descriptions of FIGS. 1-11 are also applicable to FIG. 12, and are incorporated herein by reference. Thus, the above description may not be repeated here.

In operation 1201, the processor 110 of FIG. 3 sets the number of layers to be quantized with a lower-bit precision.

In operation 1202, the processor 110 of FIG. 3 sorts layers of a neural network based on the analyzed weight difference statistic, for example, a mean square, as in FIGS. 8A to 8C. In other words, the processor 110 may sort layers in order of the size of the weight difference statistic, for example, a mean square, in ascending order or descending order.

In operation 1203, the processor 110 determines a number of layers having a lower statistic from among all sorted layers as layers to be quantized.

In operation 1204, the processor 110 quantizes the determined layers with a lower-bit precision, thereby generating a quantized neural network.

Referring to FIG. 12, unlike the method of FIG. 11 using a binary search algorithm, the processor 110 of FIG. 3 determines a number of layers in ascending order of the size of the analyzed statistic among the sorted layers to be the layers to be quantized with a lower-bit precision.

In FIGS. 11 and 12, a method of selecting layers to be quantized with a lower-bit precision based on the statistic of weight differences for each layer, for example, a mean square, described in FIGS. 8A to 8C is described below. However, the present disclosure is not limited thereto, and a method of determining layers to be quantized with a lower-bit precision by selecting layers having a lower statistic using the weight difference statistic in a different manner may be used.

Figure 13:
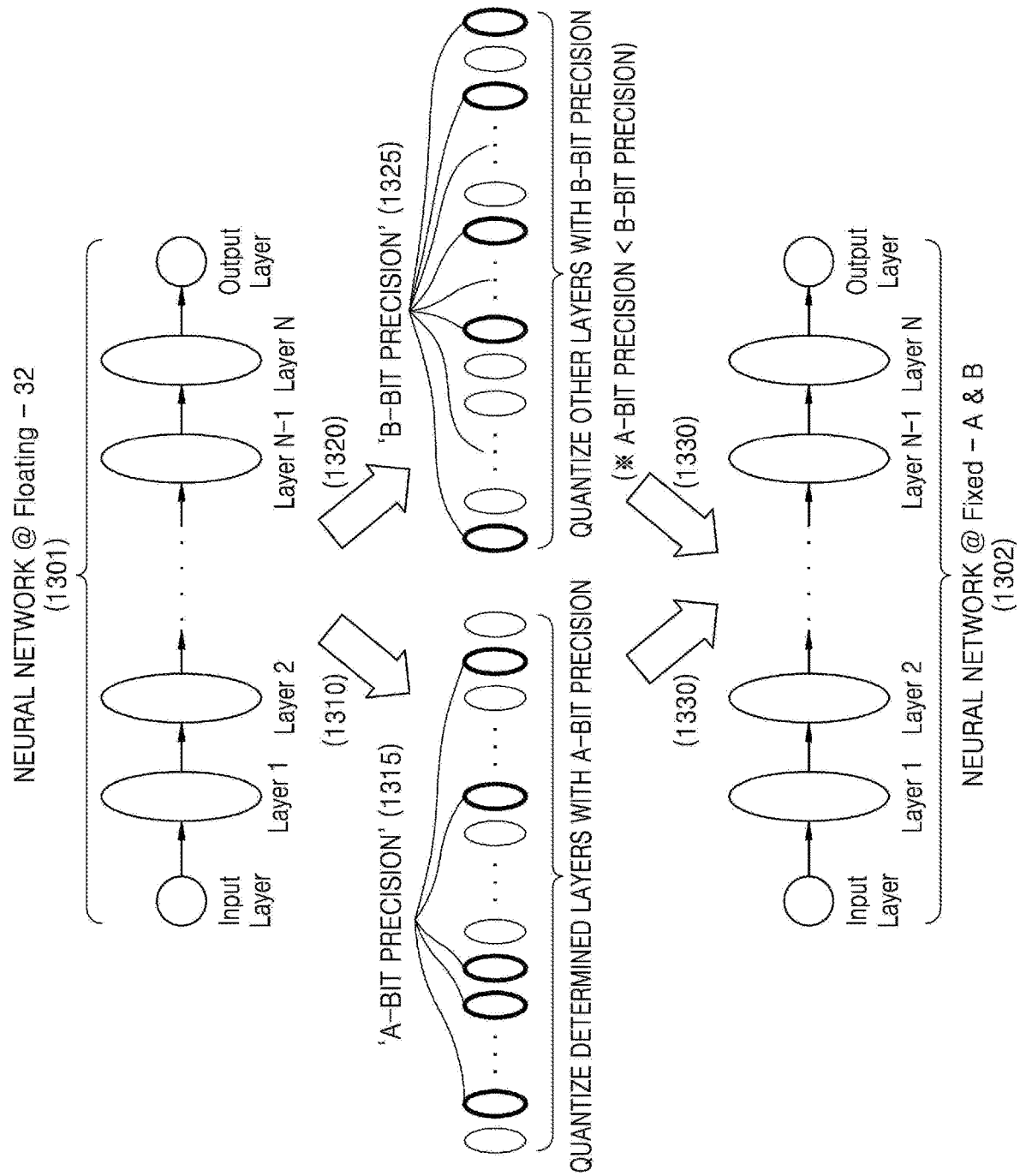
FIG. 13 is a diagram illustrating an example of quantization of a neural network including layers of floating-point parameters to a neural network including layers of fixed-point parameters.

FIG. 13 is a diagram illustrating an example for describing quantization of a neural network 1301 including layers of floating-point parameters to a neural network including layers of fixed-point parameters.

Referring to FIG. 13, the neural network 1301 may include N-number of layers of 32-bit floating-point parameters. The processor 110 of FIG. 3 performs a process 1310 of analyzing the statistic of weight differences for each layer through feedforward and backpropagation learning of the neural network 1301 and determining one or more layers 1315 to be quantized with an "A-bit precision" lower than 32-bit precision based on the analyzed weight difference statistic. Accordingly, some layers 1315 determined among all layers of the neural network 1301 are quantized with the A-bit precision.

The processor 110 performs a process 1320 of quantizing the other layers 1325 that are not determined to be quantized with the A-bit precision from among all layers of the neural network 1301 to layers of fixed-point parameters with a "B-bit precision" that is lower than 32-bit precision and higher than the A-bit precision.

When a bit precision with which all layers of the neural network 1301 are quantized is determined, the processor 110 performs a process 1330 of quantizing each layer with the determined bit precision, thereby generating a quantized neural network 1302. The quantized neural network 1302 include the layers 1315 having fixed-point parameters of the A-bit precision and the other layers 1325 having fixed-point parameters of the B-bit precision.

Figure 14:
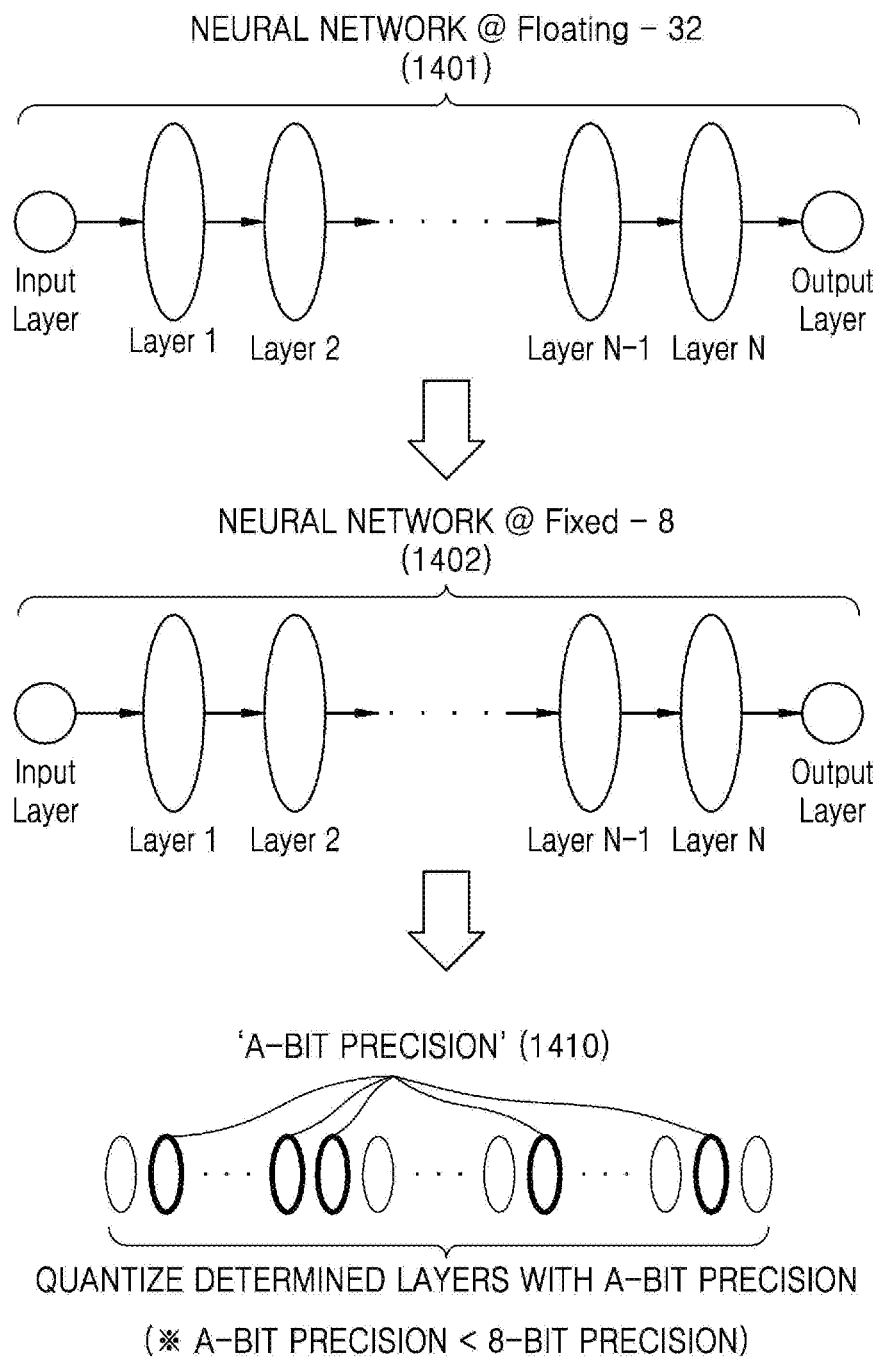
FIG. 14 is a diagram illustrating an example of quantization of a neural network including layers of floating-point parameters to a neural network including layers of fixed-point parameters.

FIG. 14 is a diagram illustrating an example for describing quantization of a neural network 1401 including layers of floating-point parameters to a neural network including layers of fixed-point parameters.

Referring to FIG. 14, the neural network 1401 may include layers of N-number of 32-bit floating-point parameters. A neural network 1402 is obtained by quantizing the neural network 1401 and has N-number of layers of 8-bit fixed-point parameters.

The processor 110 of FIG. 3 analyzes the statistic of weight differences for each layer through feedforward and backpropagation learning of the neural network 1402 quantized with an 8-bit precision, and determines one or more layers 1410 to be quantized with a "A-bit precision" that is lower than the 8-bit precision among layers based on the analyzed weight difference statistic. Accordingly, the layers 1410 determined among all layers of the neural network 1402 are quantized with the A-bit precision.

Consequently, the neural network 1401 is quantized to a neural network including the layers 1410 having fixed-point parameters of the A-bit precision and the other layers having fixed-point parameters of 8-bit precision.

The bit precision value, for example, 32 bits or 8 bits, of the neural network described in FIGS. 13 and 14 are exemplary for convenience of explanation, and the present disclosure is not limited thereto.

Figure 15:
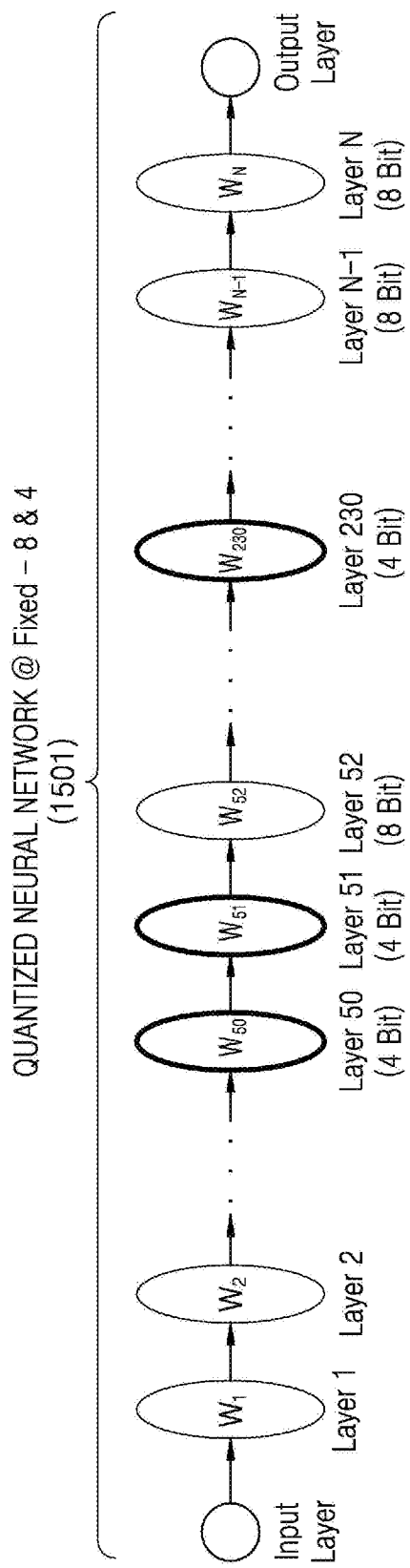
FIG. 15 is a diagram illustrating an example of a quantized neural network.

FIG. 15 is a diagram illustrating an example of a quantized neural network 1501.

Referring to FIG. 15, the quantized neural network 1501 may include layers having a 4-bit precision (lower-bit precision) and layers having an 8-bit precision. In this regard, the layers having a 4-bit precision are layers having a lower-bit precision and correspond to the layers determined based on the analyzed weight difference statistic obtained by analyzing the statistic of weight differences for each layer through feedforward and backpropagation learning as described above. The number of layers having a 4-bit precision may be determined, as described above, to reduce accuracy loss of the neural network 1501.

The identification numbers of FIG. 15 are defined merely for convenience of explanation, and the present disclosure is not limited thereto.

Figure 16:
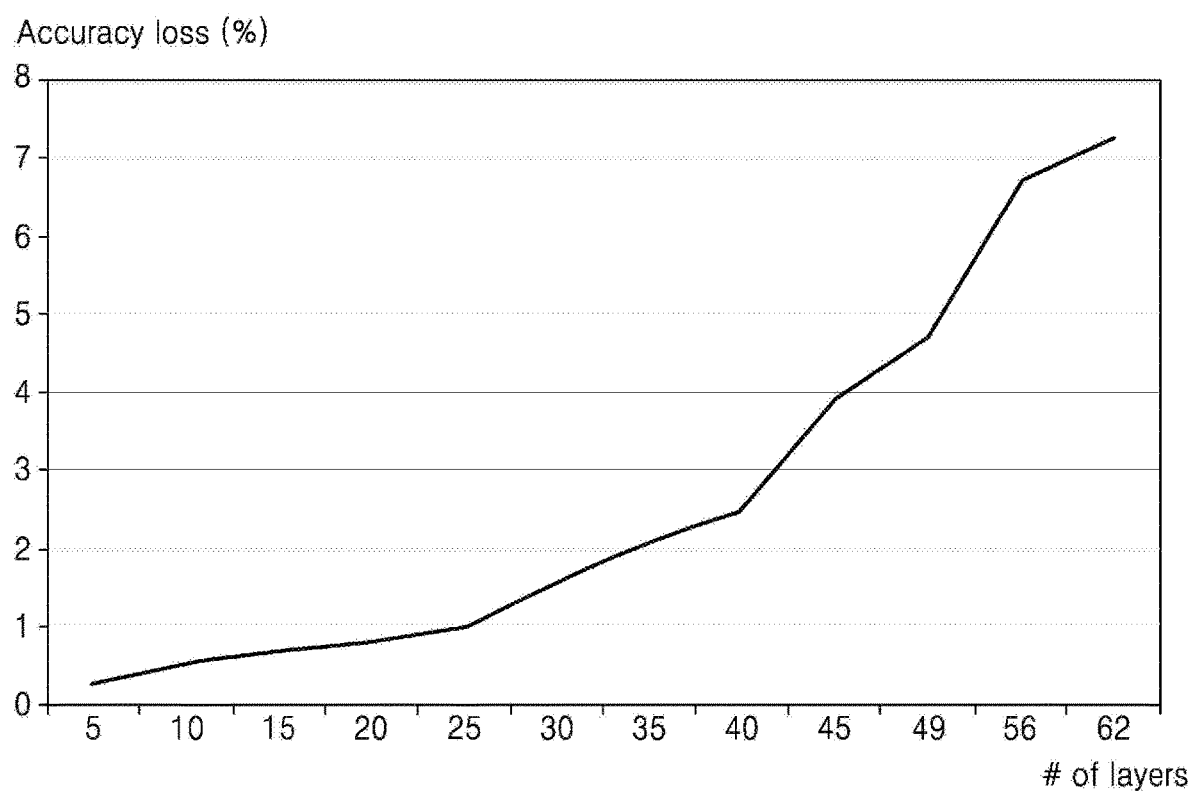
FIG. 16 is a diagram illustrating an example of a correlationship between the number of layers quantized with a lower-bit precision and accuracy loss.

FIG. 16 is a graph illustrating an example of a correlationship between the number of layers quantized with a lower-bit precision and accuracy loss. In an example, the accuracy loss may be about the recognition rate of a neural network.

FIG. 16 illustrates an example of a simulation result of Inception V3, which shows a correlation of accuracy loss when some layers having a lower weight difference statistic (mean square) among all layers having weights. In the example of FIG. 16, some layers having a lower weight difference statistic (mean square) is quantized with a 4-bit precision and the other layers have an 8-bit precision.

As the number of layers to be quantized with lower-bit precision increases, accuracy loss increases because as the number of quantized layers increases, a loss of parameters occurs. When only twenty-five (25) layers of all ninety-five (95) layers having an 8-bit precision are additionally quantized with a lower-bit (4-bit) precision, accuracy loss reaches merely a level of 1%. Accordingly, although accuracy loss is merely a level of 1%, a processing speed may effectively increase while the amount of operations of the processor 110 regarding a neural network decreases. Thus, when some layers are quantized with a lower-bit precision at a tolerable level of accuracy loss, while securing high recognition accuracy or recognition rate of a neural network, efficient amount of operations and processing speed may be guaranteed in a device in which a neural network is to be deployed.

Figure 17:
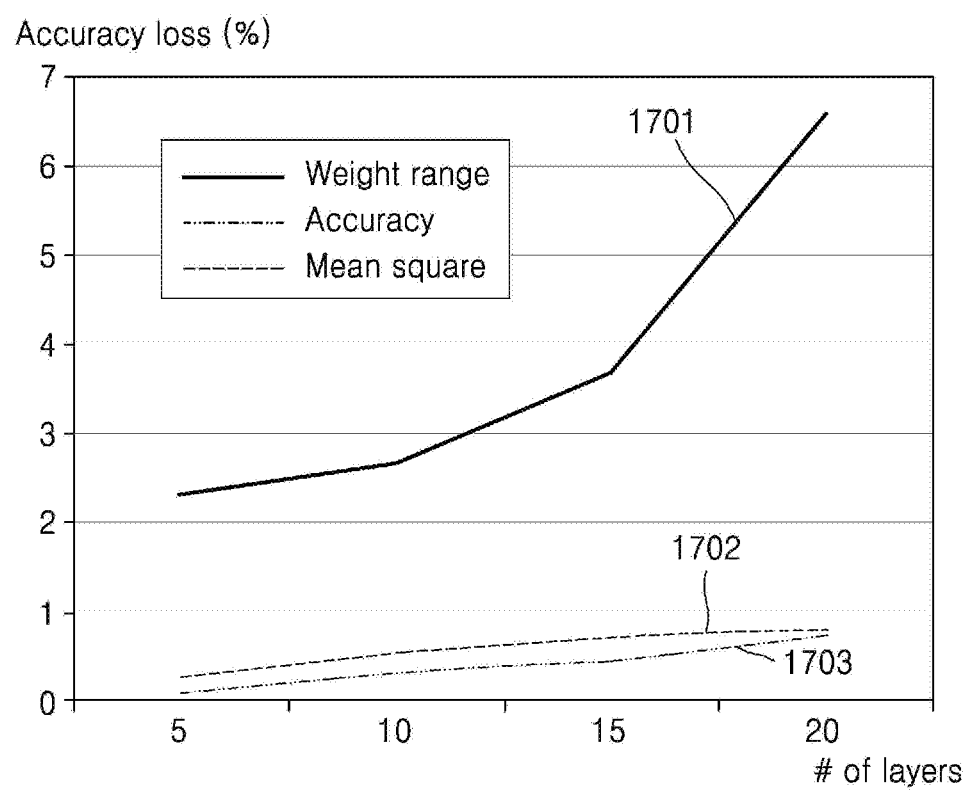
FIG. 17 is a diagram illustrating a result of comparison between using a weight difference statistic as a standard for determining layers quantized with a lower-bit precision and using other methods.

FIG. 17 is a graph illustrating an example of comparison between using a weight difference statistic and using other methods as a standard for determining the layers to be quantized with a lower-bit precision.

Referring to FIG. 17, a result of comparison between a case 1701 of using a weight range, a case 1702 of using accuracy, and a case 1703 of using a mean square of weight differences, as a standard for determining layers to be quantized with a lower-bit precision layer is shown.

In the example of 1701, a weight range for each layer is sorted in ascending order, and some layers having a small weight range are quantized with a lower-bit (4-bit) precision. However, as illustrated in FIG. 17, it may be seen that accuracy loss of the 1701 when using a weight range is larger when compared with the other cases 1702 and 1703. This is because, as a weight range decreases, a weight value to be expressed decreases and thus expression with a lower-bit precision is possible, but even when the weight range is small, when the maximum value of the weight is large, an integer bit to express the weight increases accordingly.

In the example of 1702 of using accuracy is a method in which each layer of a neural network is quantized one-by-one with a lower-bit (4-bit) precision, recognition accuracy (or recognition rate) thereof is calculated, and layers to be quantized with a lower-bit precision are determined from the smallest accuracy loss to the largest accuracy loss. As illustrated in FIG. 17, the accuracy loss of the case 1702 of using accuracy is similar to that of the case 1703 of using a mean square of weight differences. However, the case 1702 of using accuracy takes a very large amount of processing time because accuracy loss is calculated one by one while sequentially quantizing all layers included in a neural network.

Unlike the examples of 1701 and 1702, the example of 1703 of using a mean square of weight differences may determine the number of layers to be quantized with a lower-bit precision with not much of an accuracy loss, a faster processing speed, and a relatively small amount of operations.

Figure 18:
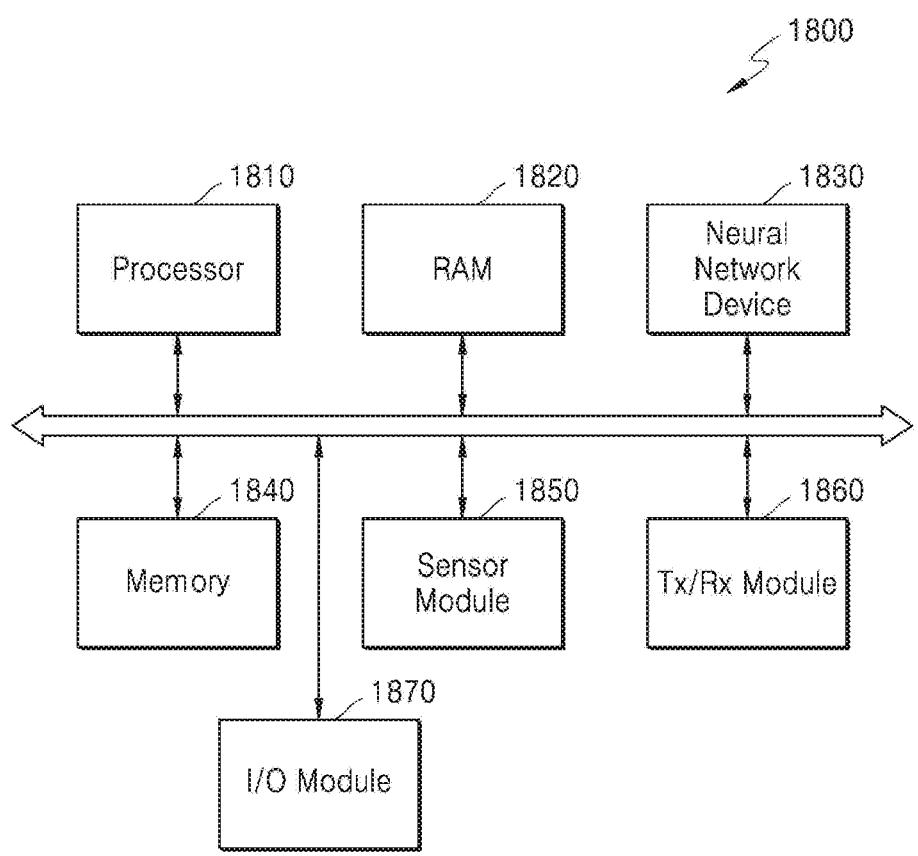
FIG. 18 is a diagram illustrating an example of an electronic device.

FIG. 18 is a diagram illustrating an example of an electronic device.

Referring to FIG. 18, an electronic device 1800 extracts information by analyzing input data in real time using a neural network, determines a situation based on the extracted information, and controls elements of an electronic device in which the electronic device 1800 is mounted based on the determined situation. For example, the electronic device 1800 may be applied to robot devices such as drones and advanced driver-assistance systems (ADAS), smart TVs, smart phones, medical devices, mobile devices, image display devices, measuring devices, and IoT devices, and may also be mounted in any of various types of electronic devices and applications mentioned with reference to FIG. 3.

In an example, the electronic device 1800 includes a processor 1810, a RAM 1820, a neural network device 1830, a memory 1840, a sensor module 1850, a communication (Tx/Rx) module 1860, and an input/output module 1870. Although not illustrated in FIG. 18, the electronic device 1800 may further include one or more other elements, such as, for example, a security module, and a power control device. Some hardware components of the electronic device 1800 may be mounted on at least one semiconductor chip. The neural network device 1830 may include the above-described neural network dedicated hardware accelerator or a device including the neural network dedicated hardware accelerator.

The processor 1810 controls all operations of the electronic device 1800. The processor 1810 may be a single-core processor or a multi-core processor. The processor 1810 processes or executes programs and/or data stored in the memory 1840. In one example, the processor 1810 controls functions of the neural network device 1830 by executing the programs stored in the memory 1840. The processor 1810 may be implemented by a CPU, a GPU, or an AP, for example. In addition to the processor 1810, the descriptions of processor 110 of FIG. 3 is also applicable to FIG. 18, and are incorporated herein by reference. Thus, the above description may not be repeated here.

The RAM 1820 temporarily stores programs, data, or instructions. For example, the programs and/or data stored in the memory 1840 may be temporarily stored in the RAM 1820 according to a boot code or the control of the processor 1810. The RAM 1820 may be implemented by memory such as dynamic RAM (DRAM) or static RAM (SRAM). Further details of the RAM 1820 is provided below.

The neural network device 1830 may perform learning on a neural network, perform an operation of the neural network based on the received input data, and generate an information signal based on a result of the operation. The neural network may include a CNN, an RNN, deep belief networks, restricted Boltzmann machines, or any of the neural networks mentioned above, but the present disclosure is not limited thereto.

The neural network device 1830 may have various processing functions such as generating a neural network, learning or training the neural network, quantizing a floating-point type neural network to a fixed-point type neural network, or retraining the neural network. In other words, the neural network device 1830 is hardware that learns a neural network and performs processing by using the above-described neural network quantized to a fixed point type, which may correspond to the above-described neural network dedicated hardware accelerator.

The information signal may be any one of various types of recognition signals such as a voice recognition signal, an object recognition signal, an image recognition signal, or a biometric information recognition signal. In one example, the neural network device 1830 receives frame data included in a video stream as input data, and generates from the frame data a recognition signal for an object included in an image indicated by the frame data. However, the neural network device 1830 is not limited thereto, and the neural network device 1830 may receive other types of input data and generate a recognition signal according to the input data, depending on the type or function of an electronic device in which the electronic device 1800 is mounted.

The memory 1840 is a storage for storing data, such as an operating system (OS), various programs, and various pieces of data. In one example, the memory 1840 stores intermediate results generated in an operation of the neural network device 1830, such as an output feature map. In one example, the memory 1840 stores a compressed output feature map. Furthermore, the memory 1840 may store quantized neural network data, such as parameters, weight maps, or a weight list, that are used by the neural network device 1830. Further details of the memory 1840 is provided below.

The memory 1840 may be a DRAM, but is not limited thereto. The memory 1840 may include either one or both of a volatile memory and a nonvolatile memory. Examples of the nonvolatile memory include ROM, PROM, EPROM, EEPROM, flash memory, PRAM, MRAM, RRAM, and Fe RAM. Examples of the volatile memory include DRAM, SRAM, SDRAM, PRAM, MRAM, RRAM, and FeRAM. In one example, the memory 1840 may include any one or any combination of any two or more of HDD, SSD, CF, SD, microSD, miniSD, and Memory Stick.

The sensor module 1850 collects information about the surroundings of the electronic device in which the electronic device 1800 is mounted. The sensor module 1850 senses or receives a signal, such as an image signal, a voice signal, a magnetic signal, a biometric signal, or a touch signal, from outside the electronic device, and converts the sensed or received signal to data. To this end, the sensor module 1850 may be any one or any combination of any two or more of various types of sensing devices, such as a microphone, an imaging device, an image sensor, a light detection and ranging (LIDAR) sensor, an ultrasonic sensor, an infrared sensor, a biosensor, or a touch sensor.

The sensor module 1850 provides the neural network device 1830 with the converted data as input data. In one example, the sensor module 1850 includes an image sensor, generates a video stream by photographing the external environment of the electronic device, and provides the neural network device 1830 with consecutive data frames of the video stream in order as input data. However, the sensor module 1850 is not limited thereto, and the sensor module 1850 may provide other types of data to the neural network device 1830.

The communication module 1860 includes various wired or wireless interfaces capable of communicating with external devices. For example, the communication module 1860 may include a local area network (LAN), a wireless local area network (WLAN) such as Wi-Fi, a wireless personal area network (WPAN) such as Bluetooth, a wireless universal serial bus (USB), ZigBee, near-field communication (NFC), radio-frequency identification (RFID), power-line communication (PLC), or a communication interface capable of connecting to a mobile cellular network such as 3rd generation (3G), 4th generation (4G), or long-term evolution (LTE).

In one example, the communication module 1860 receives data of a quantized neural network from the external device. The external device may be a device, such as the neural network quantization apparatus 10 of FIG. 3, that trains a neural network based on a large amount of data, quantizes the trained neural network to a fixed-point neural network, and provides the quantized neural network data to the electronic device 1800. The received quantized neural network data is stored in the memory 1840.

The input/output module 1870 is a physical structure that includes one or more hardware components that provide the ability to render a user interface, render a display, outputs information, and/or receive user input. The input/output module 1870 outputs the result that it receives from the electronic device 1800. However, the input/output module 1870 is not limited to the example described above, and in an example, any displays, such as, for example, computer monitor and eye glass display (EGD) that are operatively connected to the electronic device 1800 may be used without departing from the spirit and scope of the illustrative examples described.

Figure 19:
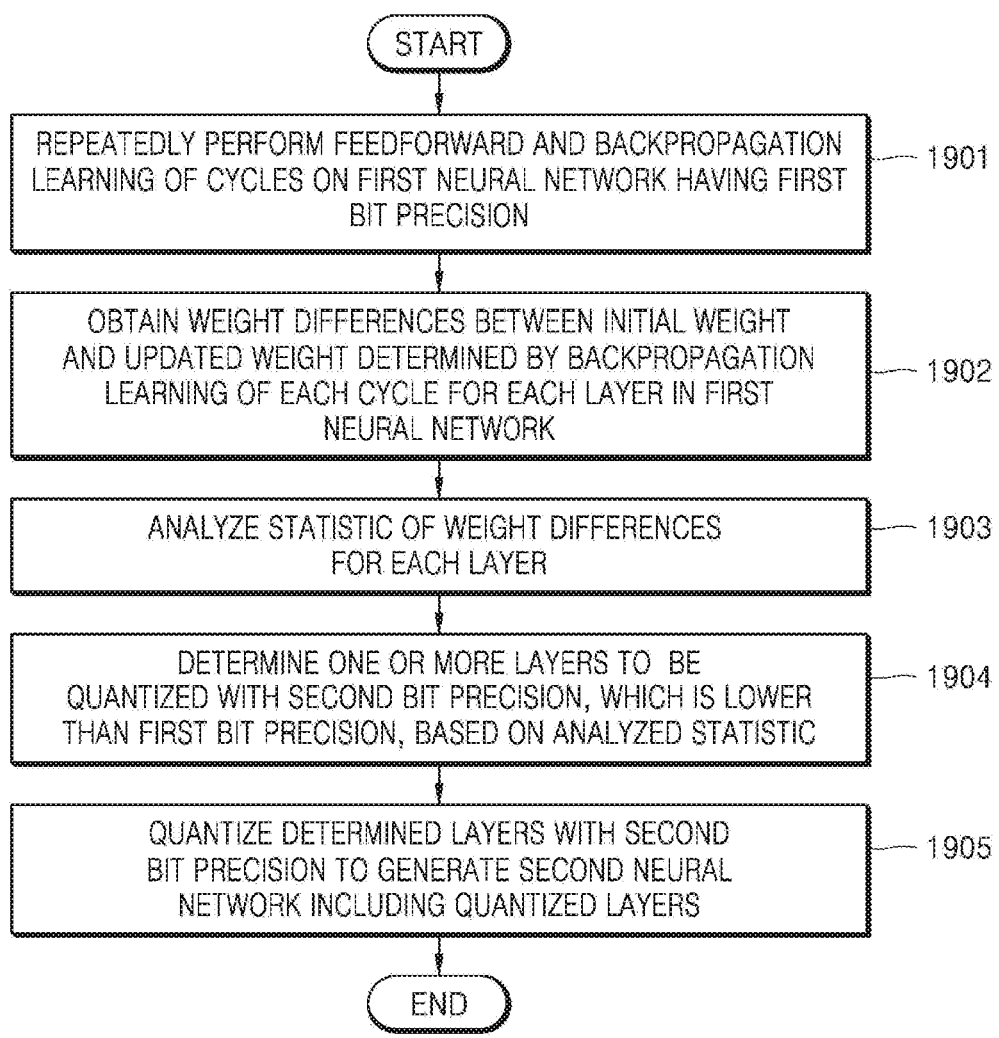
FIG. 19 is a diagram illustrating an example of a method of quantizing a neural network.

FIG. 19 is a diagram illustrating an example of a method of quantizing a neural network. The operations in FIG. 19 may be performed in the sequence and manner as shown, although the order of some operations may be changed or some of the operations omitted without departing from the spirit and scope of the illustrative examples described. Many of the operations shown in FIG. 19 may be performed in parallel or concurrently. One or more blocks of FIG. 19, and combinations of the blocks, can be implemented by special purpose hardware-based computer, such as a processor, that perform the specified functions, or combinations of special purpose hardware and computer instructions. In an example, the operation of FIG. 19 may be performed by the neural network quantization apparatus 10 of FIG. 3. In addition to the description of FIG. 19 below, the descriptions of FIGS. 1-18 are also applicable to FIG. 19, and are incorporated herein by reference. Thus, the above description may not be repeated here.

In operation 1901, the processor 110 repeatedly performs feedforward and backpropagation learning for a plurality of cycles on the first neural network that has a first bit precision.

In operation 1902, the processor 110 obtains weight differences between an initial weight and an updated weight that is determined by backpropagation learning of each cycle for each of the layers in the first neural network.

In operation 1903, the processor 110 analyzes the statistic of weight differences for each of the layers.

In operation 1904, the processor 110 determines one or more layers that are to be quantized with a second bit precision, which is lower than the first bit precision, based on the analyzed statistic.

In operation 1905, the processor 110 quantizes the determined layers with the second bit precision, thereby generating the second neural network including quantized layers.

The neural network quantization apparatus 10, in FIG. 3, the neural processing unit (NPU) in FIG. 4, and the electronic device 1800, the neural network device 1830, in FIG. 18 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2, 7-15, and 19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of outputting the state information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for neural network quantization on a neural network including a plurality of layers, the method comprising:
performing a plurality of cycles of feedforward and backpropagation learning on each layer of a first neural network having a first-bit precision;
obtaining, for each cycle of the feedforward and backpropagation learning, a weight difference between an initial weight and an updated weight, the updated weight being determined by the backpropagation learning of each cycle;
analyzing, for each layer of the first neural network, a statistic of the weight differences;
determining, based on the analyzed statistic, one or more layers, from among the plurality of layers, to be quantized with a second bit precision that is lower than the first bit precision; and
generating a second neural network by quantizing the determined one or more layers with the second bit precision.

2. The method of claim 1, wherein the statistic comprises performing a mean square of each weight difference of each cycle for each of the layers.

3. The method of claim 1, further comprising sorting the plurality of layers in an order of a size of the analyzed statistic,
wherein the determining of the one or more layers to be quantized comprises identifying, from among the sorted layers, the one or more layers having a relatively small analyzed statistic size.

4. The method of claim 3, wherein the determining of the one or more layers to be quantized comprises identifying, using a binary search algorithm and in response to an accuracy loss of the second neural network in which the one or more layers among the sorted layers are quantized with the second bit precision is equal or within a threshold in comparison with the first neural network in which the one or more layers among the sorted layers are not quantized with the second bit precision, the one or more layers to be quantized.

5. The method of claim 4, wherein the accuracy loss comprises a recognition rate of the first neural network.

6. The method of claim 3, wherein the determining of the one or more layers to be quantized comprises determining a number of layers from among the sorted layers to be the one or more layers in ascending order based on a size of the analyzed statistic.

7. The method of claim 3, wherein the determining of the one or more layers to be quantized comprises selecting to not determine a layer having a smallest analyzed statistic size from among the sorted layers to be the one or more layers to be quantized.

8. The method of claim 1, further comprising, quantizing, in response to the first neural network having layers of floating-point parameters of the first bit precision, layers other than the one or more layers, of the plurality of layers, to layers of fixed-point parameters of a fourth bit precision that is lower than the first bit precision and higher than the second bit precision,
wherein the quantized second neural network comprises the determined one or more layers having fixed-point parameters of the second bit precision and the layers have fixed-point parameters of the fourth bit precision.

9. A non-transitory computer-readable storage medium storing instructions that, when executed by a processor, cause the processor to perform the method defined in claim 1.

10. A method for neural network quantization, the method comprising:
performing feedforward and backpropagation learning for a plurality of cycles on a first neural network having a first bit precision;
obtaining weight differences between an initial weight and an updated weight determined by the learning of each cycle for each of layers in the first neural network;
analyzing a statistic of the weight differences for each of the layers;
determining one or more layers, from among the layers, to be quantized with a second bit precision lower than the first bit precision, based on the analyzed statistic; and
generating a second neural network by quantizing the determined one or more layers with the second bit precision, wherein
the first neural network has layers of fixed point parameters of the first bit precision and is quantized from a third neural network having layers of floating point parameters of a third bit precision that is higher than the first bit precision, and
the quantized second neural network comprises the determined one or more layers have fixed-point parameters of the second bit precision and other layers with the fixed-point parameters of the first bit precision.

11. An apparatus for neural network quantization on a neural network including a plurality of layers, the apparatus comprising:
a processor configured to:
perform a plurality of cycles of feedforward and backpropagation learning on each layer of the first neural network having a first bit precision;
obtain, for each cycle of the feedforward and backpropagation learning, a weight difference between an initial weight and an updated weight, the updated weight being determined by the backpropagation learning of each cycle;
analyze, for each layer of the first neural network, a statistic of weight differences;
determine, based on the analyzed statistic, one or more layers, from among the plurality of layers, to be quantized with a second bit precision that is lower than the first bit precision; and
generate a second neural network by quantizing the determined one or more layers with the second bit precision.

12. The apparatus of claim 11, wherein the statistic comprises performing a mean square of each weight difference of each cycle for each of the layers.

13. The apparatus of claim 11, wherein the processor is further configured to:
sort the plurality of layers in an order of a size of the analyzed statistic; and
identify, from among the sorted layers, the one or more layers having relatively small analyzed statistic size.

14. The apparatus of claim 13, wherein the processor is further configured to identify, using a binary search algorithm and in response to an accuracy loss of the second neural network in which the one or more layers among the sorted layers are quantized with the second bit precision is equal or within a threshold in comparison with the first neural network in which the one or more layers among the sorted layers are not quantized with the second bit precision, the one or more layers to be quantized.

15. The apparatus of claim 14, wherein the accuracy loss comprises a recognition rate of the neural network.

16. The apparatus of claim 13, wherein the processor is further configured to determine a number of layers from among the sorted layers to be the one or more layers in ascending order based on a size of the analyzed statistic.

17. The apparatus of claim 13, wherein the processor is further configured to not determine a layer having a smallest analyzed statistic size from among the sorted layers to be the one or more layers to be quantized.

18. The apparatus of claim 11, wherein the first neural network has layers of fixed point parameters of the first bit precision and is quantized from a third neural network having layers of floating point parameters of a third bit precision that is higher than the first bit precision, and the quantized second neural network comprises the determined one or more layers have fixed-point parameters of the second bit precision and other layers with the fixed-point parameters of the first bit precision.

19. The apparatus of claim 11, wherein the processor is further configured to quantize, in response to the first neural network having layers of floating-point parameters of the first bit precision, layers other than the one or more layers, of the plurality of layers, to layers of fixed-point parameters of a fourth bit precision that is lower than the first bit precision and higher than the second bit precision, and the quantized second neural network comprises the determined one or more layers having fixed-point parameters of the second bit precision and the layers have fixed-point parameters of the fourth bit precision.

20. The apparatus of claim 11, further comprising a memory storing instructions that, when executed, configures the processor to perform the learning, obtain the weight differences, analyze the statistic, determine the one or more layers, and generate the second neural network.

\* \* \* \* \*